US008774837B2

(12) United States Patent
Wright

(10) Patent No.: US 8,774,837 B2
(45) Date of Patent: Jul. 8, 2014

(54) METHODS, SYSTEMS AND APPARATUSES OF EMERGENCY VEHICLE LOCATING AND THE DISRUPTION THEREOF

(76) Inventor: John Anthony Wright, Alpharetta, GA (US)

(*) Notice: Subject to any disclaimer, the term of this patent is extended or adjusted under 35 U.S.C. 154(b) by 87 days.

(21) Appl. No.: 13/460,760

(22) Filed: Apr. 30, 2012

(65) Prior Publication Data

US 2012/0302287 A1 Nov. 29, 2012

Related U.S. Application Data

(60) Provisional application No. 61/481,193, filed on Apr. 30, 2011.

(51) Int. Cl.
*H04W 24/00* (2009.01)

(52) U.S. Cl.
USPC .................. 455/456.3; 455/404.1; 455/404.2; 455/456.2; 455/457; 705/16

(58) Field of Classification Search
USPC .......... 455/456.3, 404.2, 404.1, 456.1, 456.2, 455/457; 705/16
See application file for complete search history.

(56) References Cited

U.S. PATENT DOCUMENTS 1,991,443 A 2/1935 Becker
2,134,535 A 10/1938 Eunge et at.
2,160,135 A 5/1939 Fritz et al.
2,170,835 A 8/1939 Simon
2,198,113 A 4/1940 Holmes et al.
2,213,273 A 9/1940 Earp at al.
2,213,874 A 9/1940 Wagstaffe et al.
2,234,654 A 3/1941 Runge et al.
2,314,883 A 3/1943 Herson et al.
2,408,048 A 9/1946 Labin et al.
2,423,437 A 7/1947 Budenborn et al.
2,524,768 A 10/1950 Clark et al.
2,972,742 A 2/1961 Ross et al.
3,104,391 A 9/1963 Hansel et al.
3,115,633 A 12/1963 Steiner et al.
3,430,243 A 2/1969 Evans at al.
3,470,479 A 9/1969 Jane et at.
3,568,161 A 3/1971 Knickel
3,673,560 A 6/1972 Barsh et al.
(Continued)

FOREIGN PATENT DOCUMENTS

EP 0846311 B1 6/1998
EP 1014105 A2 6/2000
EP 1177685 A2 6/2001

OTHER PUBLICATIONS http://www.batswireless.com/products/dome-tracking-systems/amats-300/.

(Continued)

*Primary Examiner* — Sanh Phu
(74) *Attorney, Agent, or Firm* — Cislo & Thomas, LLP

(57) ABSTRACT

A system for determining the location of at least one vehicle, the at least on vehicle emitting a detectable signal. The system comprising at least one mobile or stationary detection device that detects the signal emitted by the at least one vehicle. A server with operational software for tracking and locating the at least one vehicle emitting a detectable signal, and a user interface device for interfacing with the network for providing location information on the at least one vehicle.

4 Claims, 21 Drawing Sheets

(56) References Cited

U.S. PATENT DOCUMENTS

| | | | | |
|---|---|---|---|---|
| 3,729,738 | A | 4/1973 | Cross et al. | |
| 3,731,273 | A | 5/1973 | Hunt | |
| 3,784,970 | A | 1/1974 | Simpkin | |
| 3,854,119 | A | 12/1974 | Friedman et al. | |
| 3,873,963 | A | 3/1975 | Neal et al. | |
| 3,922,677 | A | 11/1975 | Tomkewitsch et al. | |
| 3,946,395 | A | 3/1976 | Kirchhoff | |
| 3,972,044 | A | 7/1976 | Alford | |
| 3,997,868 | A | 12/1976 | Ribnick et al. | |
| 4,100,529 | A | 7/1978 | Evans | |
| 4,216,545 | A | 8/1980 | Flickshu et al. | |
| 4,227,196 | A | 10/1980 | Langeraar | |
| 4,229,737 | A | 10/1980 | Heldwein et al. | |
| 4,229,740 | A | 10/1980 | Krilanovich | |
| 4,238,778 | A | 12/1980 | Ohsumi | |
| 4,305,077 | A | 12/1981 | Tsumura | |
| 4,396,885 | A | 8/1983 | Constant | |
| 4,403,208 | A | 9/1983 | Hodgson et al. | |
| 4,481,519 | A | 11/1984 | Margerum | |
| 4,728,959 | A | 3/1988 | Maloney et al. | |
| 4,747,064 | A | 5/1988 | Johnston | |
| 4,757,315 | A | 7/1988 | Lichtenberg et al. | |
| 4,764,978 | A | 8/1988 | Argo et al. | |
| 4,766,439 | A | 8/1988 | Misek | |
| 4,791,420 | A | 12/1988 | Baba | |
| 4,794,394 | A | 12/1988 | Halstead | |
| 4,799,062 | A | 1/1989 | Sanderford, Jr. et al. | |
| 4,804,937 | A | 2/1989 | Barbiaux et al. | |
| 4,809,012 | A | 2/1989 | Tong | |
| 4,833,469 | A | 5/1989 | David | |
| 4,841,302 | A | 6/1989 | Henry | |
| 4,845,502 | A | 7/1989 | Carr et al. | |
| 4,849,692 | A | 7/1989 | Blood | |
| 4,888,593 | A | 12/1989 | Friedman et al. | |
| 4,897,661 | A | 1/1990 | Hiraiwa | |
| 4,945,305 | A | 7/1990 | Blood | |
| 4,975,710 | A | 12/1990 | Baghdady | |
| 5,030,959 | A | 7/1991 | Hayden | |
| 5,049,885 | A | 9/1991 | Orr | |
| 5,075,696 | A | 12/1991 | Wilby et al. | |
| 5,119,102 | A | 6/1992 | Barnard | |
| 5,134,406 | A | 7/1992 | Orr | |
| 5,150,310 | A | 9/1992 | Greenspun et al. | |
| 5,208,756 | A | 5/1993 | Song | |
| 5,235,329 | A | 8/1993 | Jackson | |
| 5,255,000 | A | 10/1993 | Puzzo | |
| 5,274,670 | A | 12/1993 | Serizawa et al. | |
| 5,278,553 | A | 1/1994 | Cornett et al. | |
| 5,303,259 | A | 4/1994 | Loveall | |
| 5,305,007 | A | 4/1994 | Orr et al. | |
| 5,307,060 | A | 4/1994 | Prevulsky et al. | |
| 5,311,197 | A | 5/1994 | Sorden et al. | |
| 5,450,329 | A | 9/1995 | Tanner | |
| 5,539,398 | A | 7/1996 | Hall et al. | |
| 5,541,913 | A | 7/1996 | Witters et al. | |
| 5,559,508 | A | 9/1996 | Orr et al. | |
| 5,594,432 | A | 1/1997 | Oliva et al. | |
| 5,635,921 | A | 6/1997 | Maxwell et al. | |
| 5,694,546 | A | 12/1997 | Reisman | |
| 5,706,010 | A | 1/1998 | Franke | |
| 5,757,284 | A | 5/1998 | Trizzino et al. | |
| 5,808,560 | A | 9/1998 | Mulanax | |
| 5,809,424 | A | 9/1998 | Eizenhoefer | |
| 5,812,069 | A | 9/1998 | Albrecht et al. | |
| 5,835,052 | A | 11/1998 | Iwakuni | |
| 5,889,475 | A | 3/1999 | Klosinski et al. | |
| 5,933,093 | A | 8/1999 | Austin, II | |
| 5,959,551 | A | 9/1999 | Cardillo | |
| 5,990,821 | A | 11/1999 | Sakar | |
| 5,999,131 | A | 12/1999 | Sullivan | |
| 6,006,113 | A | 12/1999 | Meredith | |
| 6,061,565 | A | 5/2000 | Innes et al. | |
| 6,084,551 | A | 7/2000 | Aslan | |
| 6,087,961 | A | 7/2000 | Markow | |
| 6,118,403 | A | 9/2000 | Lang | |
| 6,160,493 | A | 12/2000 | Smith | |
| 6,175,324 | B1 | 1/2001 | Valentine et al. | |
| 6,188,913 | B1 | 2/2001 | Fukagawa et al. | |
| 6,236,365 | B1 | 5/2001 | LeBlanc et al. | |
| 6,243,587 | B1 * | 6/2001 | Dent et al. | 455/456.2 |
| 6,246,862 | B1 | 6/2001 | Grivas et al. | |
| 6,252,544 | B1 | 6/2001 | Hoffberg | |
| 6,289,005 | B1 | 9/2001 | Katz | |
| 6,308,073 | B1 | 10/2001 | Petty et al. | |
| 6,326,903 | B1 | 12/2001 | Gross et al. | |
| 6,327,312 | B1 | 12/2001 | Jovanovich et al. | |
| 6,333,713 | B1 | 12/2001 | Nakagawa et al. | |
| 6,369,564 | B1 | 4/2002 | Khalfin et al. | |
| 6,404,351 | B1 | 6/2002 | Beinke | |
| 6,429,812 | B1 | 8/2002 | Hoffberg | |
| 6,501,955 | B1 | 12/2002 | Durrant et al. | |
| 6,529,831 | B1 | 3/2003 | Smith et al. | |
| 6,552,684 | B2 | 4/2003 | Hoshino et al. | |
| 6,560,462 | B1 | 5/2003 | Ravi et al. | |
| 6,614,362 | B2 | 9/2003 | Siegel | |
| 6,617,995 | B2 | 9/2003 | Kim et al. | |
| 6,647,270 | B1 | 11/2003 | Himmelstein | |
| 6,650,948 | B1 | 11/2003 | Atkinson et al. | |
| 6,700,504 | B1 | 3/2004 | Aslandogan et al. | |
| 6,714,865 | B2 | 3/2004 | Angwin et al. | |
| 6,778,101 | B2 | 8/2004 | Turbeville et al. | |
| 6,798,354 | B2 | 9/2004 | Schuessler | |
| 6,812,824 | B1 | 11/2004 | Goldinger et al. | |
| 6,822,580 | B2 | 11/2004 | Ewing et al. | |
| 6,859,147 | B2 | 2/2005 | Buscemi | |
| 6,898,235 | B1 | 5/2005 | Carlin et al. | |
| 6,973,319 | B2 | 12/2005 | Ormson | |
| 7,035,311 | B2 | 4/2006 | Nohara et al. | |
| 7,061,402 | B1 | 6/2006 | Lawson | |
| 7,099,776 | B2 | 8/2006 | King et al. | |
| 7,116,326 | B2 | 10/2006 | Soulchin et al. | |
| 7,148,484 | B2 | 12/2006 | Craig et al. | |
| 7,159,654 | B2 | 1/2007 | Ellison et al. | |
| 7,174,308 | B2 | 2/2007 | Bergman et al. | |
| 7,205,931 | B2 | 4/2007 | Gila et al. | |
| 7,236,101 | B2 | 6/2007 | Halishak | |
| 7,245,258 | B2 | 7/2007 | Velhal et al. | |
| 7,269,387 | B2 | 9/2007 | Wolf et al. | |
| 7,271,736 | B2 | 9/2007 | Siegel et al. | |
| 7,271,737 | B1 | 9/2007 | Hoffberg | |
| 7,280,067 | B2 | 10/2007 | Chiodini | |
| 7,301,494 | B2 | 11/2007 | Waters | |
| 7,397,381 | B2 | 7/2008 | DiPiazza | |
| 7,432,847 | B2 | 10/2008 | Fedotov et al. | |
| 7,436,364 | B2 | 10/2008 | Nishikido et al. | |
| 7,466,444 | B2 | 12/2008 | Silverbrook et al. | |
| 7,468,696 | B2 | 12/2008 | Bornholdt | |
| 7,471,236 | B1 | 12/2008 | Pitt et al. | |
| 7,496,370 | B2 | 2/2009 | Bhaumick | |
| 7,515,065 | B1 | 4/2009 | Bygrave et al. | |
| 7,522,876 | B1 | 4/2009 | Meitzen et al. | |
| 7,590,383 | B2 | 9/2009 | Dean et al. | |
| 7,627,327 | B2 | 12/2009 | Kennedy, Jr. et al. | |
| 7,646,711 | B2 | 1/2010 | Yazaki et al. | |
| 7,676,242 | B2 | 3/2010 | Siddiqui et al. | |
| 7,764,219 | B2 | 7/2010 | Pitt et al. | |
| 7,783,316 | B1 | 8/2010 | Mitchell | |
| RE41,905 | E | 11/2010 | Fleming, III | |
| 7,916,071 | B2 | 3/2011 | Harper | |
| 7,928,891 | B2 | 4/2011 | Zheng | |
| 7,999,721 | B2 | 8/2011 | Orr | |
| 8,098,152 | B2 * | 1/2012 | Zhang et al. | 340/539.13 |
| 8,131,239 | B1 | 3/2012 | Walker et al. | |
| 8,134,493 | B2 | 3/2012 | Noble et al. | |
| 8,165,606 | B2 * | 4/2012 | Dunn et al. | 455/456.6 |
| 2001/0038344 | A1 | 11/2001 | Garcia | |
| 2006/0262800 | A1 | 11/2006 | Martinez et al. | |
| 2007/0008108 | A1 * | 1/2007 | Schurig et al. | 340/539.11 |
| 2007/0015553 | A1 | 1/2007 | Siddiqui | |
| 2007/0060147 | A1 | 3/2007 | Shin et al. | |
| 2007/0139221 | A1 | 6/2007 | Falvey | |
| 2007/0161383 | A1 * | 7/2007 | Caci | 455/457 |
| 2007/0266173 | A1 | 11/2007 | Wong et al. | |
| 2008/0018543 | A1 | 1/2008 | Baliarda et al. | |

(56) References Cited

U.S. PATENT DOCUMENTS

| | | | |
|---|---|---|---|
| 2008/0119705 | A1 | 5/2008 | Patel et al. |
| 2009/0164253 | A1 | 6/2009 | Lyshkow |
| 2010/0082397 | A1 | 4/2010 | Blegen |
| 2010/0254267 | A1 | 10/2010 | Blackwell |
| 2010/0281475 | A1 | 11/2010 | Jain et al. |
| 2010/0295672 | A1 | 11/2010 | Hyland et al. |
| 2010/0302042 | A1 | 12/2010 | Barnett et al. |
| 2012/0256783 | A1 | 10/2012 | Sego et al. |

OTHER PUBLICATIONS http://nsystems.com/nupod-main.php.

http://www.orbit-cs.com/media/tracking-and-telemetry.

http://www.rdlcom.com/en/products/rdl-2000-radio-platfom.

Antenna Tracking Systems, TESSCO http://www.tessco.com/products/displayProducts.do?groupId=458&subgroupID=10.

Colbham PLC, Aerospace and Security, Antenna Systems, http://www.cobham.com/about-cobham/aerospace-and-security/about-us/antenna-systems/orlando/our-products-and-services.

Motorola XT8-5000 Digital Radio System Specs, http://www.motorola.com/web/Business/Products/Two-way %20Radios/Portable%20Radios/Government%20and%20Public%20Safety%20Portable%20.

APCO P25 Decoder/Demodulator for WR-G305 Series, http://www.winradio.com/home/g305-apco25.htm.

Radaractive, Speed Trap Information Network, http://radaractive.com/.

RF Signal Measurement & Analysis Products—Survey Technologies. http://www.surveytech.com/products.html.

www.cobham.com/media/242172/tracstar%20i600t.pdf.

* cited by examiner

METHODS, SYSTEMS AND APPARATUSES OF EMERGENCY VEHICLE LOCATING AND THE DISRUPTION THEREOF

CROSS-REFERENCE TO RELATED APPLICATIONS

This patent application claims the benefit of U.S. Provisional Patent Application Ser. No. 61/481,193 filed Apr. 30, 2011 for A Method, System, and Apparatus for Emergency Vehicle Locating and the Disruption Thereof, which application is incorporated in its entirety herein by this reference.

FIELD OF THE INVENTION

The present disclosure relates generally to telecommunications and vehicle tracking and localization. More particularly the present disclosure relates to emergency vehicle tracking, localization, and its disruption.

SUMMARY OF INVENTION

It is desirable in many instances to be able to track and or determine the location of a vehicle. The present disclosure is applicable to the tracking and localization of any vehicle emitting a detectable signal. In one embodiment, the detectable signal is a radio signal emitted by the vehicle. In another embodiment, the signal is a digital, land-mobile, radio emission that could be spread-spectrum, frequency-hopping, AES-encrypted and, or modulated in CQPSK format.

In one embodiment, the teachings of the present disclosure may be used to track and/or locate a vehicle, such as, but not limited to, an emergency vehicle. Emergency vehicles include, fire trucks, ambulances, police vehicles and emergency response vehicles. Emergency vehicles transmit a continuous signal to provide information about the emergency vehicle's location. This signal may be used to track and/locate the emergency vehicle.

Tracking and/or locating emergency vehicles is advantageous to a user in many ways. For example, if a user is aware of a number of emergency vehicles at a particular location, the user may decide to avoid such area. In addition, a user may be provided warning of the presence of an emergency vehicle and take appropriate steps to allow the emergency vehicle safe passage.

It may also be desirable in some instances to disrupt a method, system, and apparatus for emergency vehicle locating. The present disclosure is applicable to the counter-solution to tracking and locating an emergency vehicle. Law enforcement and military vehicles specifically may desire to not have their radio signals measured and thus allow their location (s) to be calculated and/or compromised.

In a first aspect, the present disclosure relates to a stationary detection device that detects a signal emitted by a vehicle, such as an emergency vehicle. In one embodiment, the stationary detection device detects a radio frequency signal. In a particular embodiment, the stationary detection device is linked to a network for determination and/or communication of location information regarding the vehicle emitting a detectable signal. In a particular embodiment of the first aspect, the detection device comprises an RF sensor and one or more of an RF switch, an RF antenna, RF filters, an RF tuner, an analog to digital converter, an digital signal processor, a central processing unit, flash memory, random access memory, GPS block, GPS antenna, a power supply, a network connection, a signal detection indicator, a RF spectrum analyzer, radio electromagnetic energy detector, radio scanner, two-way radio apparatus and radar detector.

In a second aspect, the present disclosure relates to a mobile detection device that detects a signal emitted by a vehicle, such as an emergency vehicle. In one embodiment, the mobile detection device detects a radio frequency signal. In a particular embodiment, the mobile detection device is linked to a network for determination and/or communication of location information regarding the vehicle emitting a detectable signal. In a particular embodiment of the second aspect, the detection device comprises an RF sensor and one or more of an RF switch, an RF antenna, RF filter, an RF tuner, an analog to digital converter, an digital signal processor, a central processing unit, flash memory, random access memory, GPS antenna connection, GPS antenna, a power supply, a network connection, a signal detection indicator, a RF spectrum analyzer, radio electromagnetic energy detector, radio scanner, two-way radio apparatus and radar detector.

In a third aspect, the present disclosure provides a network for determining the location of a vehicle, such as an emergency vehicle. In one embodiment of the third aspect, the network comprises a device of the first aspect above and/or a device of the second aspect above, a server with operational software for tracking and locating a vehicle emitting a detectable signal and a user interface device, said components being in communication with one another over the network. In one embodiment, the user interface device is a phone, such as a mobile phone or smartphone, more particularly, the present invention relates to the combination of smartphone user interface 119 technology with radio sensor 101 technologies.

In a fourth aspect, the present disclosure provides for the disruption of the above three aspects of the present invention. In one embodiment of the fourth aspect is provided for the conversion of emergency vehicle 800, from emitting an omnidirectional signal to a directional signal. In another embodiment of the fourth aspect could relate to the deployment of MRBATS (Mobile-radio base-station tracking-system) 1401. In a particular embodiment, the fourth aspect could comprise a directional wideband radio transmitter augmented with a base station tracking system and apparatus. In another embodiment of the fourth aspect it comprises an omni-directional antenna with apparatus and/or system to form a directional signal. More specifically the above particular embodiment of the fourth aspect comprises the transmission of a directed radio signal 302.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE EXEMPLARY EMBODIMENTS

The detailed description set forth below, or elsewhere herein, including any charts, tables, or figures, is intended as a description of presently-preferred embodiments of the invention and is not intended to represent the only forms in which the present invention may be constructed or utilized, nor is it intended to limit the scope of any claims based thereon.

Figure 8:
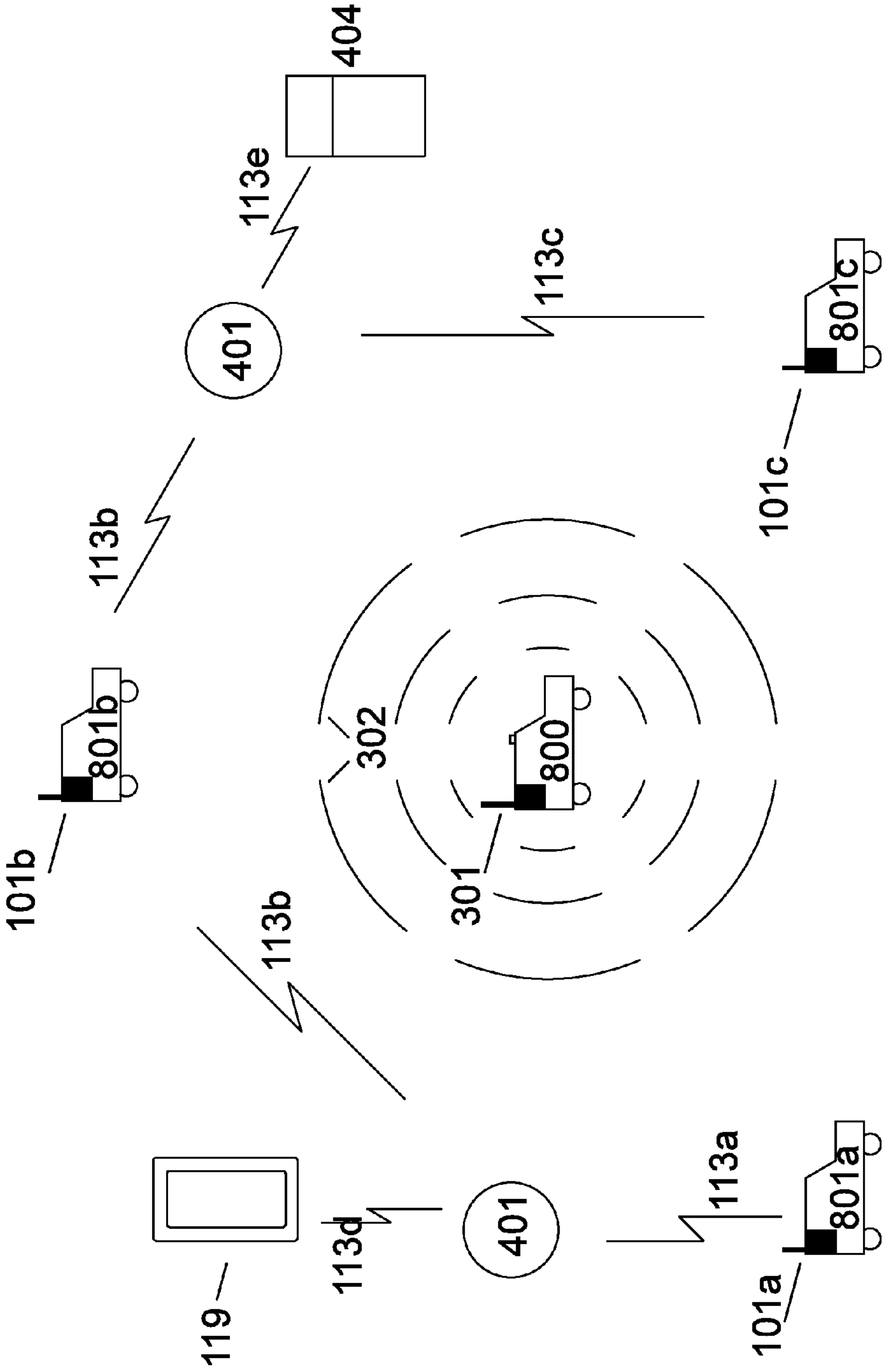
FIG. 8 depicts an exemplary embodiment of a network of mobile stations measuring the radio signal strength emitted from an emergency vehicle.

With reference to FIG. 8, a vehicle 800, such as an emergency vehicle, emits a detectable signal 302 from a transmitter 301. In many cases, the detectable signal 302 is a radio signal and the transmitter 301 is a radio transmitter. In the foregoing description, the signal 302 is described as a radio signal, although any signal in the electromagnetic spectrum could be used. The radio signal 302 emitted from emergency vehicle 800 may be omni-directional and measured by at least one stationary detection device 201 or mobile detection device 801. The stationary detection device and/or mobile detection device could share information with a network 401 via a network connection 113. The network 401 may comprise a server 404. The signal 302 measurement collected by the stationary and/or mobile detection device(s) could process said signal as described herein or as known in the art to determine location information for the emergency vehicle. Server 404 could comprise software containing radio location algorithms that calculate the emergency vehicles location; other algorithms may also be used. The location information of the emergency vehicle could be transported over a network to stationary & mobile detection devices or a user interface where the location information is displayed on a map or other visual display.

If radio signal 302 is emitted from emergency vehicle 800 in a directional format, then it could disrupt and/or limit the effectiveness of, the present invention method, system, and apparatus of locating an emergency vehicle. Disruption may occur due to the limited signal propagation from emergency vehicle to base station.

In accordance with the principles of the present invention, a method, system and apparatus is provided for tracking, detecting, and/or locating a vehicle emitting a detectable signal. Also provided is a solution for the disruption of the present invention with the description of three embodiments.

Parts or Components of the Invention

Radio Transmitter 301

Radio transmitter 301 could emit a radio signal or could send and/or receive a signal. Radio transmitter 301 could comprise, GPS, an USB machine interface, an antenna 102, an RF switch, an analog to digital converter, antenna 102, antenna 103, antenna 303, antenna 304, GPS antenna 120, GPS block 112, emergency vehicle 800, base station 201, mobile station 801, module 1505, radio transceiver, multiplexor, computer, data terminal, encryption module, video camera, network connection 113, signal amplifier, and wireless data modem. Radio transmitter 301 in a preferred embodiment could comprise a wireless data modem for connecting to base and/or mobile station (s). Radio transmitter 301 in a preferred embodiment could comprise, but is not limited to, base station 201/mobile station 801, an 800 MHz digital radio wireless data modem, multiplexor, encryption module, data terminal, GPS block 112, GPS antenna 120 radio transceiver, and omni-directional antenna 304. A transmitter 301 in another preferred embodiment could comprise MRBATS 1401, base station 201, emergency vehicle 800, signal 302, and antenna 303, 800 MHz digital radio wireless data modem, multiplexor, encryption module, data terminal, GPS block 112, GPS antenna 120, and a radio transceiver.

Radio Signal 302

Radio signal 302 may comprise electromagnetic energy. Radio signal 302 may comprise microwave(s). Radio signal 302 may comprise GPS satellite signals. Radio signal 302 may comprise a broadband, baseband, or passband signal (s). Radio signal 302 may comprise an omni-directional and/or directional emission of electromagnetic energy. Radio signal 302 may comprise MRBATS 1401, sensor 101, antenna 102, antenna 103, transmitter 301, antenna 303, antenna 304, antenna 120, emergency vehicle 800, base station 201, and mobile station 801. The radio signal 302 may comprise, but is not limited to, analog, digital, AM, FM, encrypted, or modulated two-way radio wireless communication products. Radio signal 302 may comprise channel bandwidths of 25 kHz, 12.5 kHz or 6.25 kHz. Radio Radio signal 302 may comprise frequencies from 1 kHz through 80 GHz. Radio signal 302 may comprise, but is not limited to, modulation techniques AM, SSB, QAM, FM, PM, SM, FSK, FFSK, V.23 FSK, C4FM, CQPSK, MFSK, ASK, AFSK, MFSK, DTMF, CPFSK, OOK, PSK, QAM, MSK, CPM, PPM, TCM, TSM, BPSK, QPSK, DPSK, DQPSK, SOQPSK, SOQPSKTG, OQPSK, 8VSB, QAM, PM, GMSK, GFSK, MSK, GMSK, OFDM, DMT, TCM, DSSS, CSS, FHSS, THSS, PAM, PWM, PPM, PCM, PCM/FM, DPCM, ADPCM, DM, PDM, ΣΔ, CVSDM, ADM, CM, or VSELP.

Radio signal 302 may comprise, but is not limited to, encryption algorithms DVI-XL, DVP, DVP-XL, DES, DES-ECB, DES-XL, DES-OFB, DES-CBC, DES 1-bit CFB, AES-256 ECB, AES-256 OFB, AES-256 CBC, Triple-DES, RC4, AES, CODAN, MELP, or Advanced Digital Privacy (ADP). Radio signal 302 in a preferred embodiment may comprise a wireless digital 800 MHz data modern sharing information with base station (s) as a digital data stream. The signal in this embodiment could emit from emergency vehicle 800 in an omni-directional form and utilize a line-of-sight propagation path to base station (s) and/or mobile station (s). The signal 302 in this preferred embodiment emitted from emergency vehicle 800 could comprise the 806-825 MHz range of the RF spectrum. The signal 302 in this embodiment may comprise RF channel size (s) 12.5 khz and/or 6.25 khz. The signal 302 in this embodiment may comprise spread-spectrum, frequency-hopping, time division multiple access (TDMA), and/or frequency-division multiple access (FDMA). Signal 302 in this embodiment may comprise GFSK modulation and AES encryption.

Radio signal 302 in another preferred embodiment may comprise a wireless digital 800 MHz data modem sharing information with base station (s) as a digital data stream. The signal in this embodiment could emit from emergency vehicle 800 in a directional form and utilize a line-of-sight propagation path to base station (s) and/or mobile station (s). The signal 302 in this preferred embodiment emitted from emergency vehicle 800 could comprise the 806-825 MHz range of the RF spectrum. The signal 302 in this embodiment may comprise RF channel size (s) 12.5 khz-6.25 khz. The signal 302 in this embodiment may comprise spread-spectrum, frequency-hopping, time-division multiple access (TDMA), and/or frequency-division multiple access (FDMA). Signal 302 in this embodiment may comprise GFSK modulation and AES encryption. This embodiment of signal 302 may comprise MRBATS 1401 & antenna 303 to direction-find and track base station 201. Antenna 303 may emit signal 302 in a directed form toward base station (s) and, or mobile station (s) to limit unnecessary signal propagation. By limiting signal 302 propagation, MRBATS 1401 & antenna 303, the pre-emergency vehicle locating.

Omni-Directional Antenna 304

Antenna 304 could emit a signal 302. Antenna 304 comprises an omni-directional signal propagation format that radiates outward in all directions/360 degrees. Antenna 304 could comprise transmitter 301, antenna 102, antenna 103, signal 302, antenna 303, antenna 112, RF sensor 101, base station 201, mobile station 801, emergency vehicle 801, antenna 303, MRBATS 1401, user interface 119. Antenna 304 could comprise an apparatus for the conversion of signal 302 from omni-directional, to directional. Antenna 304 in a preferred embodiment could emit an omni-directional signal that could be measured by sensor (s) 101 from at least one location, although preferably by a plurality of locations. This could allow for the calculation of an unknown emergency vehicle 800 location by triangulation of its RF signal measurement (s) by the present invention.

Emergency Vehicle 800

Emergency vehicle may emit a signal 302. Emergency vehicle 800 may comprise, but is not limited to, a police car, police motorcycle, police bicycle, ambulance, firetruck, human with radio, network connection 113, signal 302, a radio transmitter 301, antenna 303, antenna 304, network 401, and MRBATS 1401. A preferred embodiment of an emergency vehicle 800 comprises a police car, transmitter 301, MRBATS 1401, signal 302, antenna 303, base station (s) 201, mobile station (s) 801, and RF sensor network FIG. 4. Another preferred embodiment of an emergency vehicle 800 comprises an ambulance, transmitter 301, signal 302, antenna 304, base station (s) 201, mobile station 801.

Radio Frequency (Rf) Sensor 101

RF sensor 101 comprises an apparatus that could sense, detect, and/or measure radio electromagnetic energy in the RF spectrum. RF sensor 101 could sense RF electromagnetic emissions from 1 khz to 8 GHz. RF sensor 101 could comprise a mobile station and/or base station embodiment. RF sensor 101 could comprise the generation of alerts by audible, visual, and touch means. RF sensor 101 could comprise but is not limited to, a radio-frequency (RF) spectrum analyzer, radio electromagnetic energy detector, radio scanner, two-way radio apparatus, radar detector, radio detector, and GPS navigational unit.

RF sensor 101 could comprise a software defined radio transceiver. A software defined radio transceiver may comprise, a motherboard, soundcard, universal software radio peripheral, RF down-converter, analog digital converter, digital signal processor, transmitter, signal generator, digital analog converter, and RF up-converter. This configuration could also use a software based network protocol analyser is used to recognize, filter and dissect radio network traffic.

RF sensor 101 may comprise an RF antenna 102, RF antenna 103, test signal 104, RF switch 105, filters 106, RF tuner 107, analog to digital converter 108, digital signal processor/field programmable gate array 109, capture memory buffer 110, central processing unit 111, global positioning system antenna 120, network connection 113, electrical ground 114, system watchdog 115, precision time protocol module 116, power supply 117, API/SAL 118, user interface 119, GPS block 112, antenna 120, radio signal 302, antenna 303, and/or antenna 304.

A description of the above components in operation could comprise, but is not limited to, RF antenna 102 and/or RF antenna 103 measuring a radio signal 302. Antenna 102 could detect a different frequency than antenna 103. RF switch 105 could switch between antenna 102 and/or antenna 103. Preselection filters 106 could prevent antenna inputs 102 & 103 from overload by electromagnetic energy in the radio frequency (RF) spectrum. RF tuner 107 could down-convert signal 302 from RF to an IF format. Analog digital converter 108 could convert the signal information to a digital format. The digital signal processor 109 could decimate the signal for wider RF signal spans and for the identification and measurement of signals of interest located in the RF spectrum. The GPS block 112 could generate timing signals that could synchronize measurement of signals from other sensor (s) at other locations. Capture memory buffer 110 could comprise 1.2 Mb and could be used for storage of signal measurement information. Central processing unit (CPU) 111 could process information relating to the measurement or detection of radio signal. CPU 111 could receive timing signal generated by GPS block 112, and/or precision time protocol (PTP) module 116. Power supply 117 could provide electric power to rf sensor 101. Server 404 could share radio signal location information by network connection 113 to network 401 and user interface 119. Network connection 113 could enable application programming interface access to network 401 resources.

RF sensor 101 in a preferred embodiment could comprise an elevated, stationary location such as base station 201. This embodiment could also comprise, but is not limited to, network connection 113, network 401, RF sensor network, as shown in a described with respect to FIG. 4, and mobile station 801, RF sensor 101 in another preferred embodiment could comprise a signal indication detector and/or a user interface 119. In this configuration RF sensor 101 and/or user interface 119 could alert a user to the presence of an emergency vehicle. In this configuration sensor 101 could comprise the generation of audible alerts such as, but not limited to, bells, buzzers, whistles, tones, and alarms. This configuration could also generate visual alerts. Visual alerts could comprise light emitting diodes (LED), liquid crystal display (LCD), touch screen, lights, and colors. This embodiment could also comprise a vibration generating apparatus/component for an alert by touch. In this embodiment of RF sensor 101 information could be shared with a network. RF sensor 101 in this preferred embodiment could comprise a standalone radar detector module. This standalone radar detector module could detect the presence of an emergency vehicle RF communication emission. The main technological advance this embodiment comprises is the generation of an alert based upon the detection of an emergency vehicle public safety radio signal vs. the activation of speed measurement systems. Modern digital public safety mobile radio signals utilize line-of-sight signal propagation paths. This standalone radar detector module embodiment of the present invention could emit an alarm if an emergency vehicle achieves line-of-sight to sensor 101 thus generating an alert.

Another preferred embodiment of RF sensor 101 comprises a universal software defined radio peripheral. This embodiment comprises a software defined radio transceiver. A software defined radio transceiver in this embodiment comprises, a motherboard, soundcard, RF down-converter, analog digital converter, digital signal processor, transmitter, signal generator, digital analog converter, daughterboard, and RF up-converter. The software this embodiment could execute comprises a software-based network protocol analyser is used to recognize, filter and dissect radio network traffic. This is also known as traffic analysis.

Figure 4:
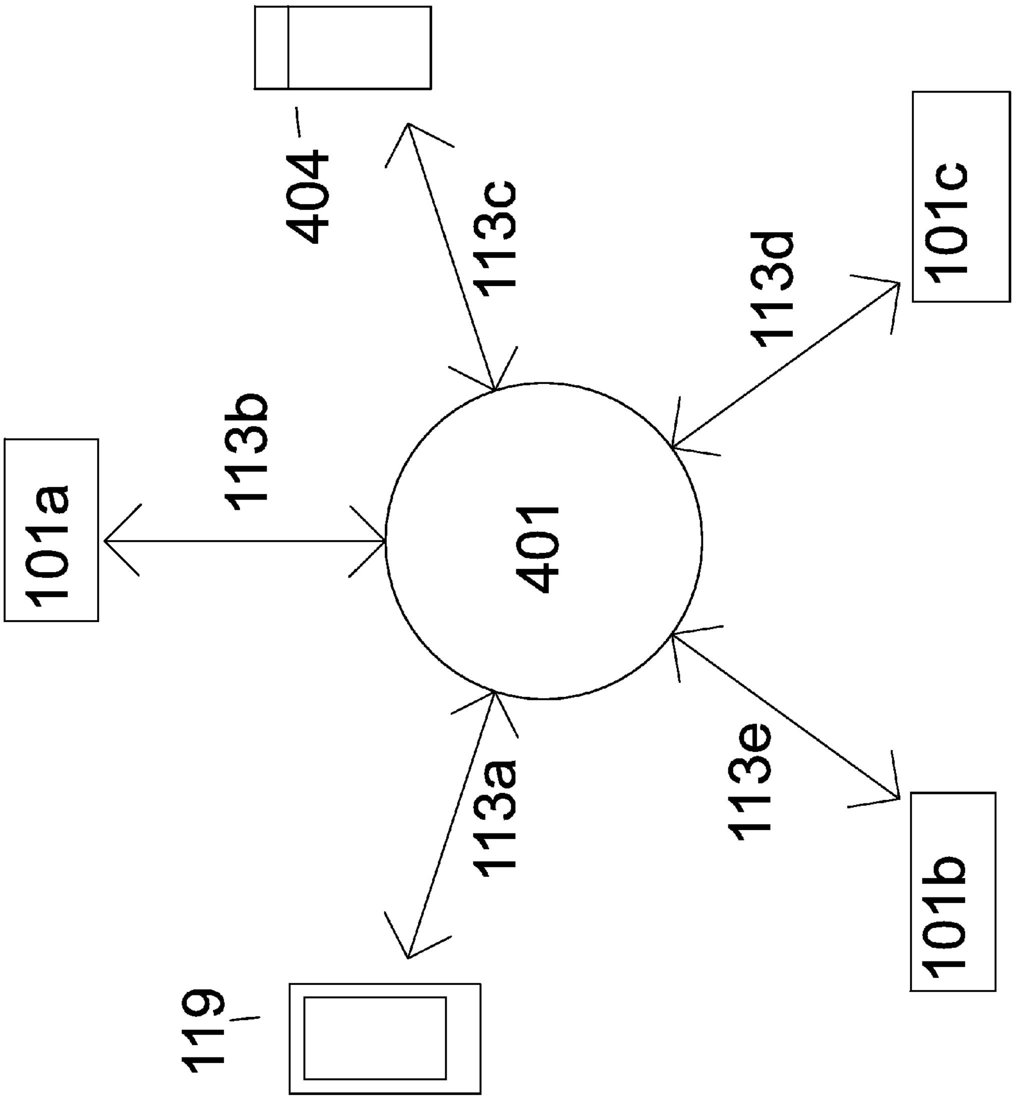
FIG. 4 illustrates a schematic view of a radio frequency sensor network in accordance with the present invention.

Rf Sensor Network—FIG. 4

RF sensor network, as shown in a described with respect to, FIG. 4 may comprise mobile and/or stationary devices. RF sensor network FIG. 4 may comprise, but is not limited to, at least one RF sensor 101, user interface 119, mobile station 801, base station 201, server 404, antenna 304, signal 302, network 401, network connection 113. An RF sensor network, as shown in a described with respect to, FIG. 4 in a preferred embodiment could comprise, but is not limited to, a plurality of RF sensors 101, and at least one server 404. RF sensor network, as shown in a described with respect to, FIG. 4 in a preferred embodiment may also comprise a radar detector. In this embodiment RF sensor network, as shown in a described with respect to, FIG. 4 may comprise a user interface, and that could receive emergency vehicle 800 location information. RF sensor network FIG. 4 could be disrupted by MRBATS 1401 by limiting RF sensor 101 exposure to RF signal 302.

Network Connection 113

Network connection 113 could comprise a wired or wireless connection. Network connection 113 could comprise an interface between network devices. Network connection 113 could comprise Bluetooth, 802.11, USB, microwaves, lasers, sound, and radio waves. Network connection 113 could comprise, but is not limited to, a router, switch, cable, computer, server, hub, wireless network access point, or modem.

A preferred embodiment of a wired network connection 113 could comprise, but is not limited to, a plurality of network devices connected with, a CATS cable, and two RJ-45 connectors. A preferred embodiment of a wired network connection 113 could also comprise, but is not limited to, an ethernet network interface card that could connect to a server 404. A preferred embodiment of a wireless network connection 113 could comprise, but is not limited to, a wireless network interface card, and a wireless network access point.

A preferred embodiment of a wireless network connection 113 could comprise, but is not limited to, an 802.11 wireless network card and an 802.11 wireless network router. Another preferred embodiment of a wireless network connection 113 could comprise, but is not limited to, a smartphone user interface 119, network 401, server 404, sensor 101, antenna 303, antenna 304, transmitter 301, and signal 302.

Network 401

Network 401 could comprise mobile or stationary nodes. Network 401 could share information such as, but not limited to, text, pictures, voice, and data. Network 401 could comprise a plurality of devices connected by a network connection 113. Network 401 devices could comprise, but is not limited to, RF sensor 101, computer server 404, router, computer, or user interface 119. Network 401 in a preferred embodiment could comprise, but is not limited to, at least one RF sensor 101, at least one network connection 113, at least one server 404, and at least one user interface 119. Network 401 in another preferred embodiment could comprise, but is not limited to, the internet.

Figure 2:
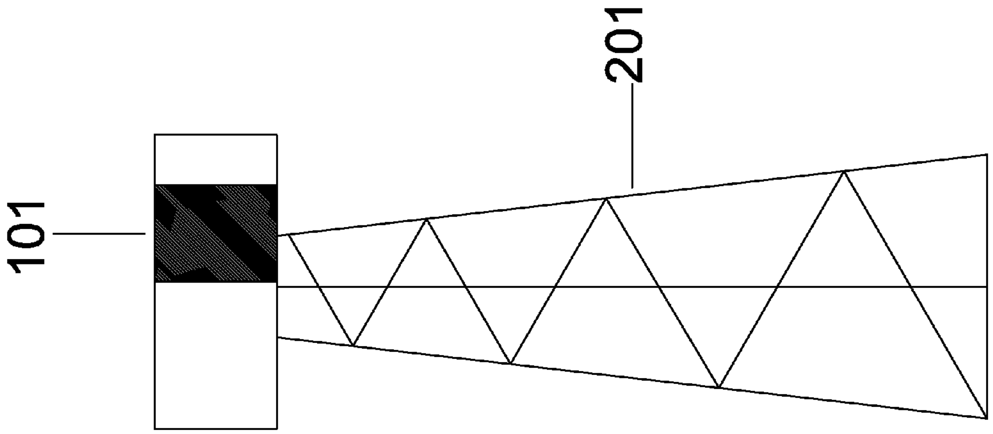
FIG. 2 depicts a side view of a preferred embodiment of a base station comprising a radio frequency detection device located on an elevated platform.

Base Station (BS) FIG. 2 & 201

Base station 201 comprises, but is not limited to, RF sensor 101, signal 302, MRBATS 1401, radio transmitter 301, radio antenna 303, antenna 304, and RF sensor 101. Base station 201 could receive omni-directional and/or directional radio signals. Base station 201 could transmit omni-directional and/or directional radio signals. Base station 201 in a preferred embodiment comprises, but is not limited to, an elevated, stationary location. An embodiment of an elevated location could comprise, but is not limited to, a tower, mast, building, or flag pole. Base station 201 in a preferred embodiment could comprise, but is not limited to, a cellular communications tower. An embodiment of a space-born base-station could comprise a communication satellite.

Figure 13:
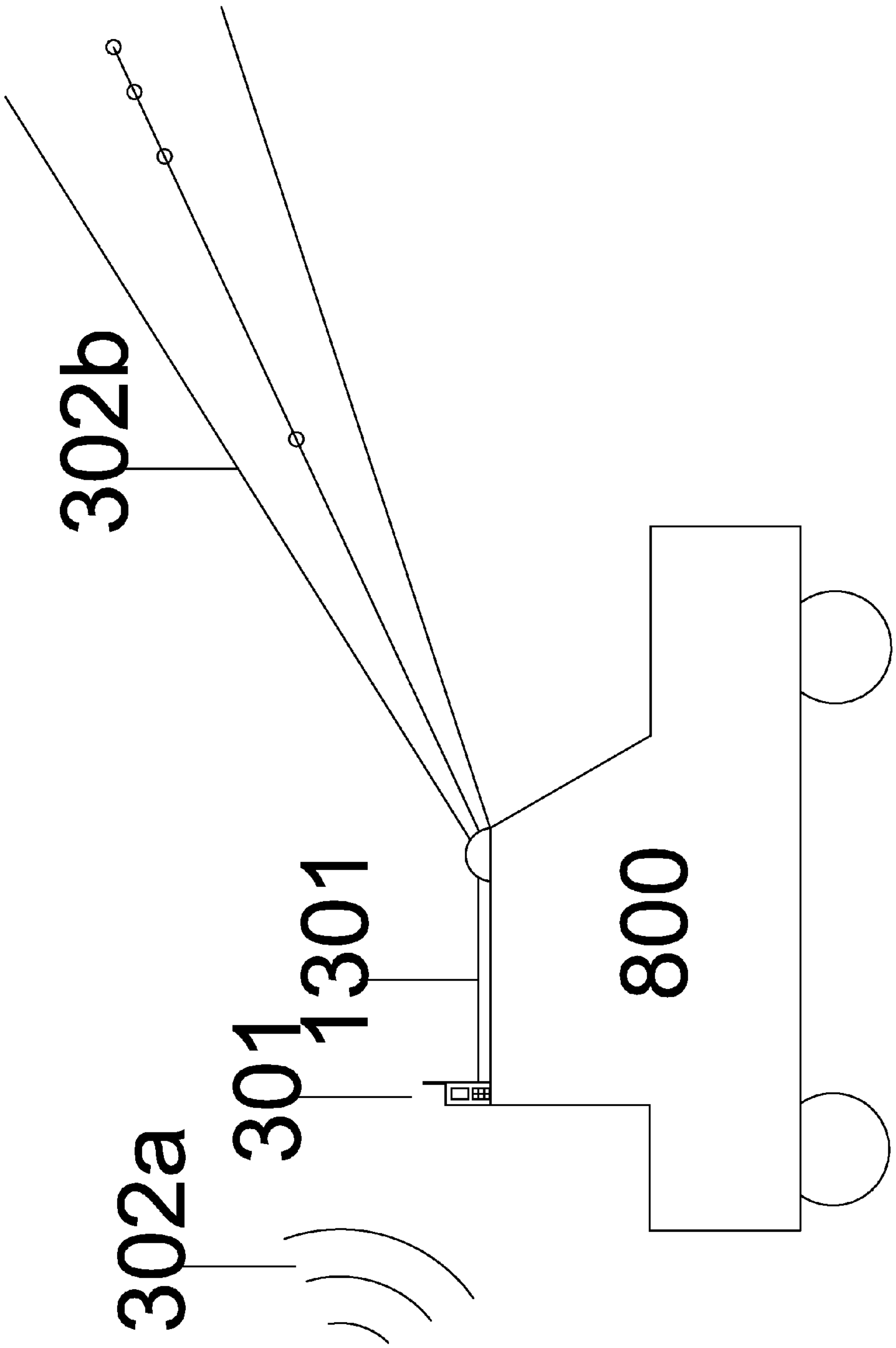
FIG. 13 depicts a preferred embodiment of an emergency vehicle sending and receiving information from or to a base station and/or mobile station.

Mobile Station (Ms) FIG. 13 & 801

Mobile station 801 could comprise, but is not limited to, transmitting, receiving, detecting, sensing and/or measuring radio signals. Mobile station 801 could comprise, but is not limited to, a vehicle or a man. Mobile station 801 could comprise, but is not limited to, MRBATS 1401, emergency vehicle 800, RF sensor network FIG. 4, radio frequency (RF) sensor 101, radio transmitter 301, signal 302, user interface 119, network connection 113, and radio antenna 303.

Mobile station 801 in an air-borne embodiment may comprise, but is not limited to, fixed-wing aircraft, rotary-wing aircraft, lighter-than-air vehicles (blimps, airships, dirigibles) and a radio-frequency (RF) sensor 101. An embodiment of a ground vehicle mobile station 801 may comprise, but is not limited to, a car, truck, bus, van, tank, or train.

An embodiment of a space born mobile station could comprise a communication satellite. A preferred embodiment of a mobile station 801 could comprise, but is not limited to an automobile, RF sensor 101, RF sensor network FIG. 4, network connection 113, and user interface 119.

Server 404

Server 404 could comprise, but is not limited to, a processor, memory, a hard drive, operating system software, and other network components and resources. Server 404 could comprise but is not limited to a computer, executable software, RF sensor 101, radio signal location algorithm (s) FIGS. 9 & 10, service-to-client software, network connection 113, network 401, user interface 119, and RF sensor network FIG. 4. Server 404 could execute algorithms such as, but is not limited to, RSSI, TDOA, AOA, and TOA. Server 404 could execute triangulation, trilateration, and/or multilateration radio signal location methods. Server 404 in a preferred embodiment may also execute radio signal location algorithm (s) to calculate the location of an emergency vehicle 800. Server 404 in a preferred embodiment could share signal measurement and emergency vehicle location information with network 401.

User Interface 119

User interface 119 may be mobile or stationary. User interface 119 may interact with a computer. User interface 119 may comprise an alert generated by touch, visual, and/or audible means. User interface 119 could generate sense of touch alert by activating a vibration apparatus. User interface 119 could generate a visual alert by displaying proximity information of emergency vehicle 800. User interface 119 could generate an audible alert by producing horns, bells, whistles, tones, alarms, or voices. User interface 119 in one embodiment could comprise, but is not limited to, RF sensor 101 and/or a smartphone as a signal detection indicator.

User interface 119 may comprise, but is not limited to, a Personal Data Assistant (PDA), Global Positioning System (GPS) navigation unit, a laptop, a netbook, a tablet computer, a smartphone, a blackberry, a personal computer (PC), or cellphone. User interface 119 may comprise, but is not limited to, a network connection 113, RF sensor 101, RF sensor network FIG. 4, base station 201, mobile station 801, emergency vehicle 800, server 404, antenna 303, antenna 304, antenna 120, network 401, and MRBATS 1401. User interface 119 may comprise but is not limited to, RF sensor 101, RF spectrum analyzer, radio electromagnetic energy detector, radio scanner, two-way radio apparatus, radar detector, and GPS navigational apparatus. User interface 119 may comprise, but is not limited to, a keyboard, a processor, random access memory, data storage, speaker, mouse, joystick, touch-screen, batterys, LEDs, lights, buttons, vibration apparatus, signal presentation application/software, and/or USB interface.

User interface 119 in a preferred embodiment of a software application could comprise, but is not limited to, depictions of roads, streets, buildings, compass-heading, GPS location, signal-of-interest geolocation, emergency vehicle locations, threat levels, road hazards, accidents, and traffic-flow information. User interface 119 in a preferred embodiment may generate an alert by touch, visual, and/or audible means when emergency vehicle 800 is nearby. User interface 119 in a preferred embodiment could comprise a signal detection indicator capable of generating an alarm/alert when emergency vehicle 800 is within a one-mile radius. User interface 119 signal detection indicator in a preferred embodiment could comprise, a light-emitting-diode (LED), Liquid Crystal Display (LCD), vibrations, visual alerts, and/or audible alerts.

User interface 119 in a preferred embodiment may comprise a smartphone software application capable of presenting continuously updated GPS location, direction information, roads, hazards, areas & signals of interest, mobile station 801, emergency vehicle 800, and/or radio transmitter 301. User interface 119 could in another preferred embodiment visual display on an LCD screen direction information, roads, hazards, areas of interest, or location. User interface 119 in a preferred embodiment could comprise, but is not limited to, a software application that could present emergency vehicle 800, mobile station 801, radio transmitter 301 and/or radio signal 302 information.

Figure 9:
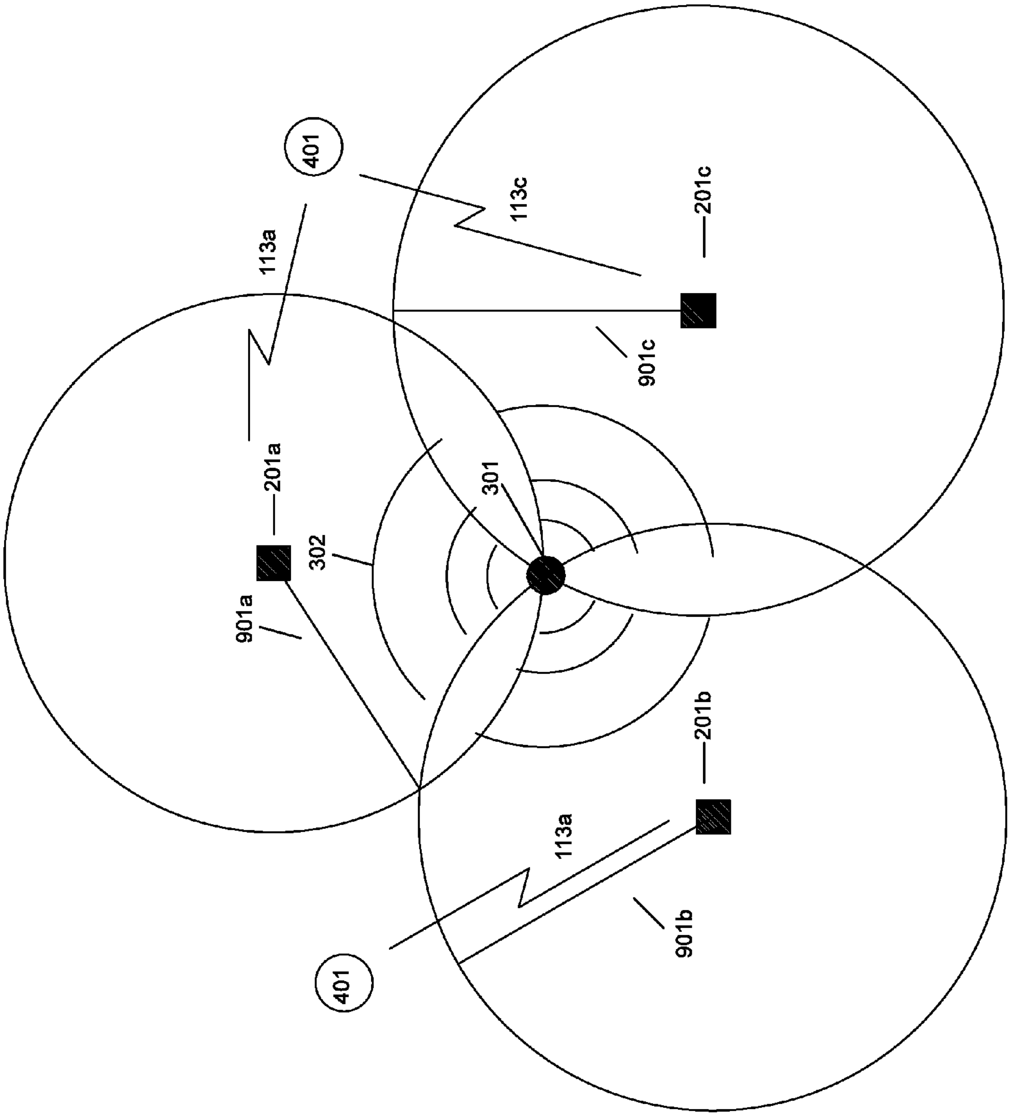
FIG. 9 illustrates an example of a radio transmitter location by triangulation method using the signal strength measurements of each base station to locate the radio transmitter.
Figure 10:
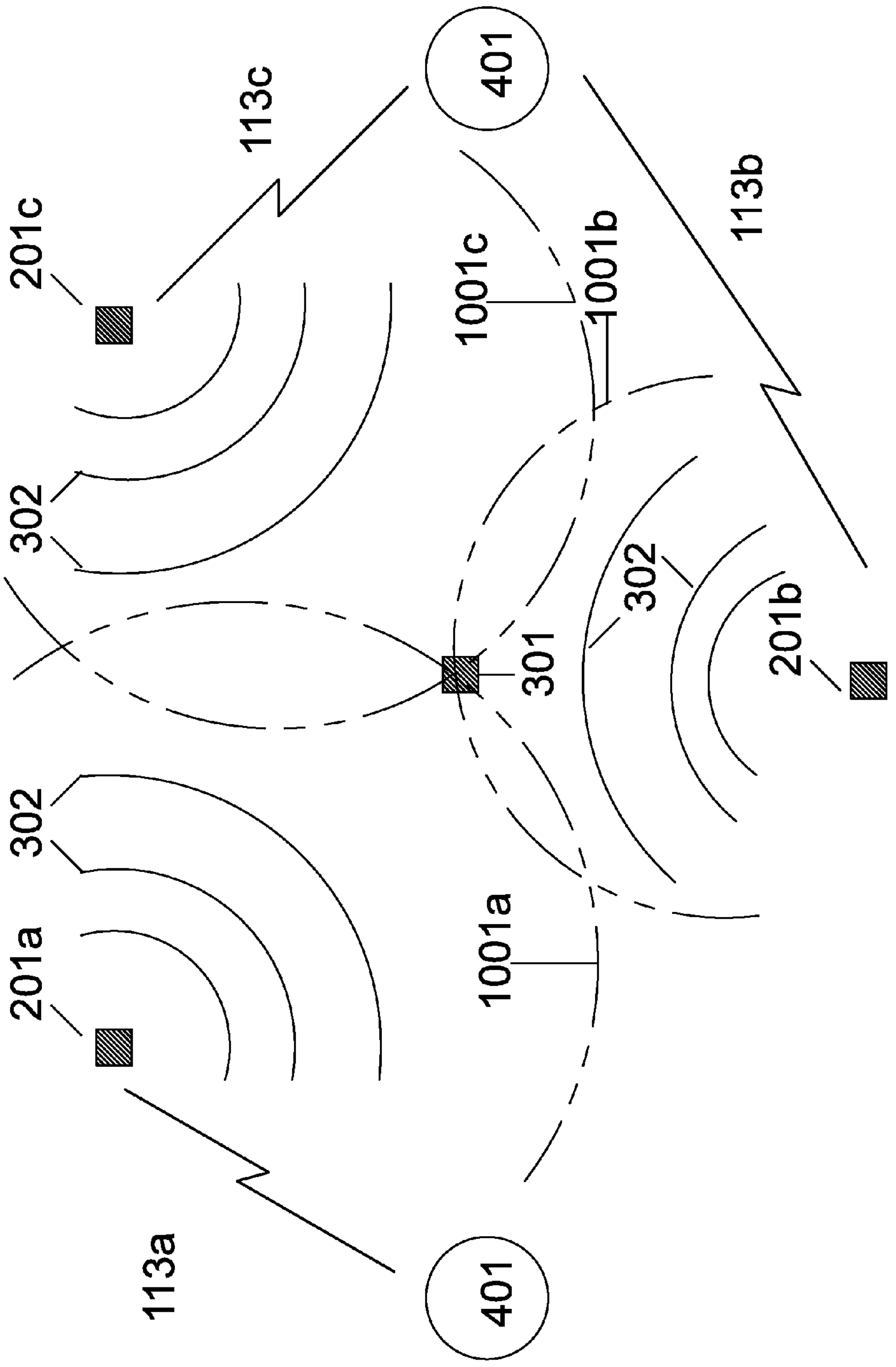
FIG. 10 illustrates an example of a time difference of arrival radio transmitter location technique in accordance with the present invention.

Radio Location Methods FIG. 9 & FIG. 10

A method for the estimation of a public safety vehicle radio transmitter unknown position is sought. An computer software algorithm could use radio transmitter emission measurement information to locate and/or detect an emergency vehicle. When signal measurement information is used for estimating a position of a transmitter or a reflector, it could be known as detection, triangulation, trilateration, and multilateration. There are several methods that may be used to calculate an unknown radio transmitter position from measurements based on signals from base or mobile stations of known position. (BS=Base Station. MS=Mobile Station.)

Received Signal Strength Indicator (RSSI) FIG. 9

Radio RSSI location algorithm could comprise measuring the signal strength of signal from at least 3 BS's from the MS or by measuring the signal strength of the MS from at least 3 BS's. The signal strength measurement could relate to MS-BS separation distances. The MS location then could be calculated by the approximate intersection of three circles of known radius by using least squares. Radio RSSI location algorithm, as shown in a described with respect to, FIG. 9 is a preferred embodiment of a method to calculate an unknown radio transmitter position by signal strength measurement 901 from base station (s) and/or mobile station (s).

Time Difference of Arrival (TDOA) FIG. 10

TDOA radio location algorithm, as shown in a described with respect to, FIG. 10 could comprise the relative time of arrival of signal 302 at three different BS or MS simultaneously (or known offset). Likewise the relative signal arrival times at three BS's of one MS could be measured. The maximum timing resolution for signal measurement depends on the sampling rate at the receiver. Precise timing synchronization of BS's are required for this method. A preferred method and apparatus for the synchronization of the base stations and mobile stations is the GPS satellite timing signal and GPS block in sensor 101. TDOA, as shown in a described with respect to, FIG. 10 estimate could be made from the intersection of 2 hyperboloids each defined by the equation:

$$Ri;j=q(Xix)2+(Yiy)2q(Xjx)2+(Yjy)2 \qquad (1)$$

where (Xn;Yn) represents the fixed coordinates of BS and Ri;j represents the propagation distance corresponding to the measured time difference _i;j. Radio TDOA location algorithm, as shown in a described with respect to, FIG. 10 is a preferred embodiment of a method to calculate an unknown radio transmitter position by signal measurements based from base station (s) and/or mobile station (s).

Angle of Arrival (AOA)

The signal AOA radio location algorithm could comprise calculating the radio signal's relative angles of arrival at an MS of three BS's or the absolute angle of arrival of the MS at two or three BS's. This radio location technique may rely on antenna arrays which could provide the direction finding capability to the receiver. The radio signal angles could be calculated by measuring phase differences across the array (phase interferometry) or by measuring the power spectral density across the array (beam-forming). Once the measurements have been made the location could be calculated by triangulation.

Time of Arrival (TOA)

The TOA radio location algorithm could comprise the MS bouncing a signal back to the BS or vice versa. The propagation time between the MS and BS could be calculated at half the time delay between transmitting and receiving the signal. The MS location could be calculated by the interception of circles from three such sets of data using least squares.

Hybrid Radio Location Techniques

A hybrid technique may comprise a plurality of the above radio location techniques.

Base-Station Tracking Methods (Bats) 1402

BATS 1402 may comprise GPS base-station tracking method (s). BATS 1402 may comprise an array of antennas for base-station direction-finding utilizing incoming signal from base station (s) and/or mobile station(s). Base-station tracking methods may comprise emergency vehicle 800, transmitter 301, signal 302, MRBATS 1401, antenna 303, module 1505, base station 201, mobile station 801, GPS block 112, and GPS antenna 120.

GPS base-station tracking method could comprise the known locations of an emergency vehicle 800 and base station (s). This embodiment of GPS tracking method could comprise transmitter 301 sharing base-station direction-finding information with module 1505. The GPS tracking method could include module 1505 manipulating antenna 303 to emit signal 302 toward base station 201 in a directional format.

Figure 19:
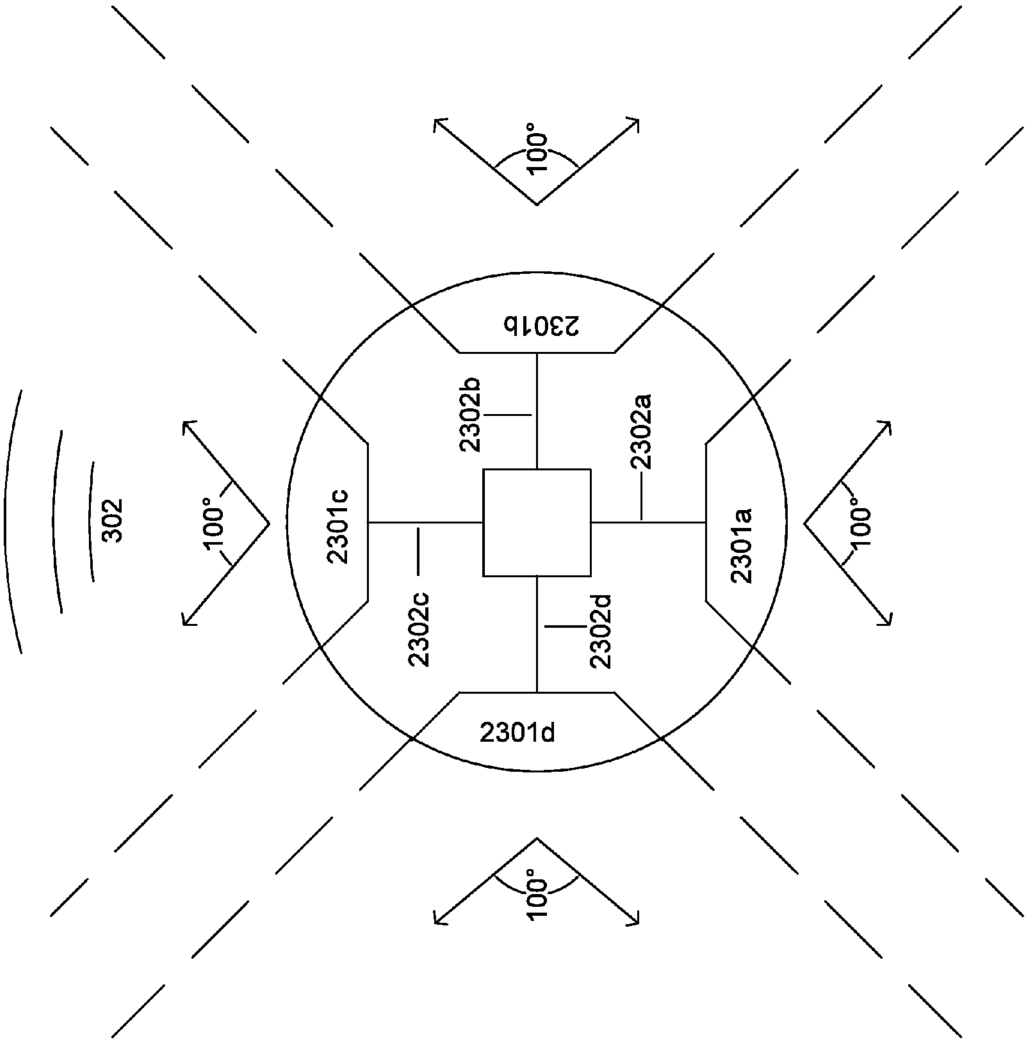
FIG. 19 depicts a top view of another preferred embodiment of the MRBATS antenna of FIG. 14.
Figure 20:
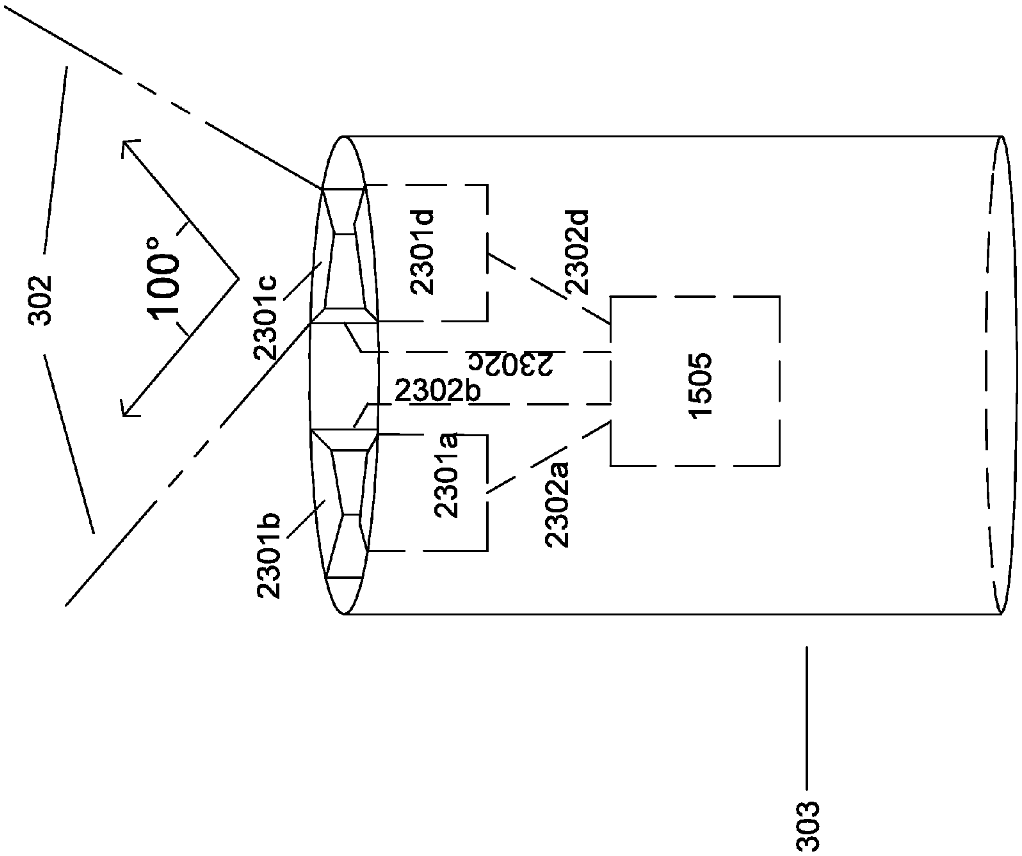
FIG. 20 depicts a side view of the embodiment of the MRBATS antenna depicted in FIG. 19.

BATS 1402 could comprise an array of antennas such as in FIGS. 19 & 20. In this embodiment antenna 303 could comprise four directional antennas 2301 configured to cover 360 degrees. In this manner only one of the four directional antennas may emit signal 302 directed toward base station (s). In this embodiment each of the four directional antennas could receive, detect, measure, or sense signal 302. Each antenna 2301 may share receive signal measurement information with module 1505. Module 1505 may communicate with transmitter 301 to determine which direction signal 302 should emit from emergency vehicle 800. Module 1505 may comprise software that calculates the direction to base station 201. Module 1505 could receive signal 302 direction-finding information by measuring the time difference of arrival of signal 302 as it arrived across the four antennas 2301 comprising antenna 303. This method of direction-finding is known as TDOA or RSSI. The first antenna 2301 that received signal 302 as it spread across the four antenna 2301 could be the only one that transmits. This could comprise a form of base-station tracking. Module 1505 could switch between antennas 2301*a*, 2301*b*, 2301*c*, and 2301*d* to only permit the antenna 2301 that was directed toward base-station 201 to emit a signal 302.

Mobile-Radio Base-Station Tracking-System (MRBATS) 1401

MRBATS comprises an apparatus that could emit a directional signal. MRBATS could disrupt the method, system, and apparatus for emergency vehicle locating. MRBATS could comprise an apparatus capable of emitting a radio signal directionally in 360 degrees. MRBATS 1401 could comprise, but is not limited to, BATS 1402, an RF signal direction-finding apparatus, radio signal 302, user interface 119, radio transmitter 301, antenna 303, antenna 304, computer module 1505, network 401, network connection 113, base station 201, network 401, emergency vehicle 800, and mobile station 801.

MRBATS 1401 tracking system in a preferred embodiment could comprise a method, system, and apparatus to allow a directional antenna to rotate 360 degrees, side to side. This could comprise tracking base station (s) by rotating antenna 303 physically to control signal direction. Tracking bases station (s) could also comprise rotating an in-ward reflective dome shell around an antenna. MRBATS could disrupt server 404 radio signal location methods by not permitting radio signal 302 to be emitted in omni-directional form.

MRBATS could disrupt sensor 101 from detecting and measuring signal 302. MRBATS could disrupt and limit base station FIG. 2 and/or mobile station 801 ability to detect, sense, and/or measure signal 302. This could be done by transforming signal 302 in a directional format, instead of omni-directional format. MRBATS could comprise software to direct signal 302 and maintain a line-of-sight network connection with a base-station of known direction and/or known GPS location. MRBATS in a preferred embodiment could comprise module 1505 sharing information with transmitter 301. MRBATS could receive location information from, but is not limited to, emergency vehicle (s), base station (s), mobile station (s), and satellite (s).

Antenna 2301

Antenna 2301 may emit a directional signal 302 Antenna 2301 may receive signal 302. Antenna 2301 may comprise, but is not limited to, an RF directional antenna, antenna 303, MRBATS 1401, module 1505, and conduit 2302. Antenna 2301 may comprise, a directional panel antenna. A preferred embodiment of antenna 2301 may emit signal 302 in a 100 degree wide angle emanating away in a directional form. Another preferred embodiment of the present disclosure comprises a plurality of antenna 2301 connected to module 1505. In this configuration it could comprise antenna 303.

Directional Antenna Apparatus 303

Antenna 303 could emit a directional radio signal 302. Antenna 303 could emit and/or receive signal 302. Antenna 303 could comprise an apparatus for the emission of a directed signal 302. Antenna 303 in some configurations may also emit signal 302 in an omni-directional format. Antenna 303 could comprise a parabolic antenna. Antenna 303 could comprise a rotatable platform to aim a directional antenna toward base station(s). Antenna 303 could comprise an apparatus to aim the directional antenna up or down. Antenna 303 could comprise an array of directional antennas.

Antenna 303 could comprise mobile station 801, base station 201, emergency vehicle 800, MRBATS 1401, antenna 102, antenna 103, radio transmitter 301, signal 302, directional antenna 303, omni-directional antenna 304, emergency vehicle 800, reflective dish 1501, rotating drive axle conduit 1502, non-reflective dome shell 1503, electric motor 1504, computer module 1505, conduit from transmitter to antenna 1506, feed antenna 1507, conduit from transmitter to computer module 1507, conduit connecting transmitter to module 1508, conduit from rotating axle to feed antenna 1509, rotating drive shaft 1510, electrical ground 1511, 12 volt power source 1512, feed antenna support arms 1513, inward reflective dome shell 1702, vertical aperture 1702, drive gear sprocket 1703, dome outer sprocket gear 1704, and top of aperture 1705.

Antenna 303 in one preferred embodiment (FIGS. 15 & 16) could comprise emergency vehicle 800, transmitter 301, dish 1501, conduit 1502, dome shell 1503, motor 1504, computer module 1505, conduit 1506, feed antenna 1507, conduit 1508, conduit 1509, drive shaft 1510, ground 1511, 12 v power 1512, and support arms 1513. In this embodiment of directional antenna 303 apparatus could be housed inside non-reflective dome shell 1503. Antenna 303 apparatus could be attached to the top of an emergency vehicle 800. Dish 1501 connects support arms 1513 to position feed antenna 1507. Feed antenna 1507 could emit a signal toward dish 1501. Dish 1501 could reflect a signal in a directional format. Dish 1501 in this embodiment could rotate 360 degrees. Motor 1504 could rotate drive shaft 1510, and/or conduit 1502, 360 degrees. Drive axle could rotate dish 1501 360 degrees. Axle 1510 could rotate dish 1501 for direction-finding and tracking. Motor 1504 could receive rotational information for dish 1501 from computer module 1505. Module 1505 could control direction of dish 1501 by controlling motor 1504. Module 1505 could connect and/or share information with transmitter 301 by signal interface 1504. Module 1505 could connect to radio transmitter 301 by conduit 1508. Module 1505 could connect to 12 V power source 1512. Module 1505 could connect to ground 1511. Transmitter 301 could share direction-finding information with module 1505 to aim dish 1501 toward a base station.

Antenna 303 in another preferred embodiment could comprise (FIGS. 17 & 18) a radio transmitter 301, signal 302, onmi-directional antenna 304, computer module 1505, conduit from transmitter to antenna 1506, conduit from transmitter to module 1508, drive shaft 1510, ground 1511, 12 volt electrical connection, vertical aperture 1701, in-ward reflective rotating dome w/vertical aperture 1702, drive gear sprocket, dome outer sprocket gear 1704, and top of aperture 1705. In this preferred embodiment (FIGS. 17 & 18) the following description could describe the operation of antenna 303:

Antenna 304 could comprise emergency vehicle 800. Antenna 304 could emit signal 302. Antenna 304 could emit signal 302 in an omni-directional format and could reflect inside dome 1702. Dome 1702 could emit signal 302 from aperture 1701 in a directional format. Signal 302 could emit from aperture 1701 in a horizontal 30 degree wide directional format from left to right. Signal 302 could emit from vertical aperture 1701 in a vertical 90 degree directional format from top center of dome 1702 known as top of vertical aperture 1705. Drive sprocket 1703 could rotate dome 1702, 360 degrees. Drive sprocket 1703 could rotate in a different direction than dome sprocket gear 1704. Drive sprocket 1703 could rotate dome 1702 and aperture 360 degrees.

Antenna 303 in one embodiment comprises an omni-directional antenna 304 augmented with a reflective apparatus. Antenna 304 and in-ward reflecting dome shell 1702 could project signal 302 through vertical aperture 1701 in a directional form. Antenna 303 could comprise a motor and/or RF transceiver (s), network connection 113, and/or computer module 1505. Antenna 303 could share information with transmitter 301 and module 1505. Drive sprocket 1703 could rotate outer dome sprocket 1704 thus allowing signal to be aimed toward base-station 201/mobile station 801. Antenna 303 in another preferred embodiment may comprise four antenna 2301 and a module 1505. Each antenna 2301 may be positioned emit signal 302 100 degree wide propagation paths on a horizontal plane. An example of this embodiment may comprise FIGS. 19 & 20. In this example only one of the four antenna 2301 may emit a signal 302 at a time. Module 1505 may comprise software that calculates the direction to base station 201. Module 1505 could determine signal 302 direction-finding information by measuring the time difference of arrival of signal 302 as it arrived across the four antennas 2301 comprising antenna 303. The first antenna that receives signal 302 as it spread across the four antenna 2301 could be the only one that transmits. This could comprise a form of base-station tracking. Module 1505 could switch between antennas 2301*a*, 2301*b*, 2301*c*, and 2301*d* to only permit the antenna 2301 that was directed toward base-station 201 to emit a signal 302.

Computer Module 1505/FIG. 23.

Module 1505 could comprise locating and tracking base-station 201 direction. Module 1505 could comprise computer software capable of constantly directing signal 302 toward base-station 201/mobile-station 801 by antenna 303. Module 1505 could comprise, but is not limited to, antenna 102, antenna 103, antenna 303, antenna (s) 2301, central processing unit 111, test signal 104, RF switch 105, RF tuner 107, GPS block 112, network connection 113, GPS antenna 120, flash memory, electrical ground 114, electrical power supply 117, user interface 119, signal 302, analog digital converter 108, and digital signal processor 109.

A description of the above components in operation could comprise transmitter 301 sharing information with module 1505. CPU 111 could process base-station 201 direction information from transmitter 301. CPU 111 could also process base-station 201 GPS direction-finding information from GPS block 112. GPS antenna 120 could receive GPS information from GPS satellites and share this information with CPU 111. CPU 111 could instruct antenna 303 toward which direction to emit directional signal 302. CPU 111 could connect to digital signal processor 109. DSP 109 could build the IF format of signal 302 for wide RF signal spans. Power supply 117 could provide electric power to module 1505. Electrical ground 114 could provide an electrical ground for module 1505. Analog digital converter 108 could convert signal 302 to an analog format. RF tuner 107 could up-convert signal 302 from IF to an RF format. In this RF format signal 302 may emit from directional antenna 2301, antenna(s) 303, antenna 304, and antenna 102/103.

Module 1505 in a preferred embodiment may comprise communicating with transmitter 301 and/or antenna 303. In this preferred embodiment module 1505 may comprise base-station direction finding information. This information may enable antenna 303 to constantly direct signal 302 toward base station 201.

Figure 1:
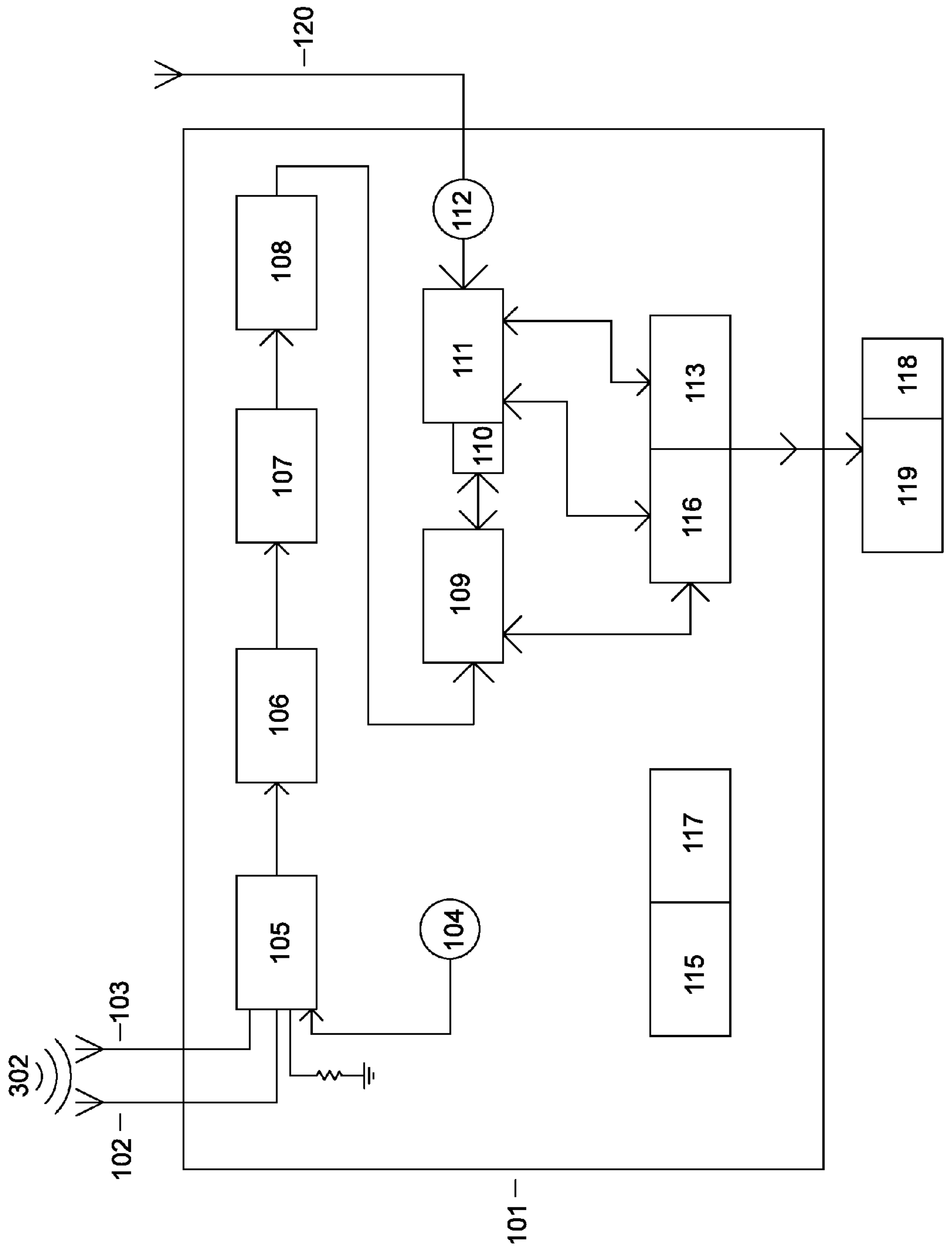
FIG. 1 depicts a block diagram of a preferred embodiment of the radio frequency detection device of the present invention.

With reference to FIG. 1, FIG. 1 depicts a block diagram in a preferred embodiment of an RF sensor 101 and internal components. FIG. 1 also could demonstrate the preferred path of the signal during processing from antenna(s) 102/103 to application programming interface 118 and/or network connection 113.

List of parts identified in FIG. 1: 101—RF Sensor, 102—RF antenna connection "a," 103—RF antenna connection "b," 104—Test signal, 105—RF switch, 106—Filters, 107—RF tuner, 108—Analog digital converter (ADC), 109—Digital signal processor/field programmable gate array (DSP/FPGA), 110—Capture memory buffer, 111—Central processing unit (CPU), 112—GPS block, 113—Network connection, 114—Electrical ground, 115—System watchdog, 116—Precision time protocol module (PTP), 117—Power supply, 118—Application programming interface/shared access layer (API/SAL), 119—User interface (UI), 120—GPS antenna, 302—Radio signal.

RF sensor 101 could comprise RF antenna 102 and/or RF antenna 103 measuring a radio signal 302. Antenna 102 could detect a different frequency than antenna 103. RF switch 105 could switch between antenna 102 and/or antenna 103. Pre-selection filters 106 could prevent antenna inputs 102 & 103 from overload by electromagnetic energy in the radio frequency (RF) spectrum. RF tuner 107 could down-convert signal 302 from RF to an IF format. Analog digital converter 108 could convert the signal information to a digital format. The digital signal processor 109 could decimate the signal for wider RF signal spans and for the identification and measurement of signals of interest located in the RF spectrum 18. The GPS block 112 and/or GPS antenna 120 could generate timing signals that could synchronize measurement of signals from other sensor (s) at other locations. Capture memory buffer 110 could comprise 1.2 Mb and could be used for storage of signal measurement information.

Central processing unit (CPU) 111 could process information relating to the measurement or detection of radio signal. CPU 111 could receive timing signal from GPS block 112, and/or precision time protocol (PTP) module 116. Power supply 117 could provide electric power to RF sensor 101 components. Server 404 could share radio signal location information by network connection 113 to network 401 and user interface 119. Network connection 113 could enable application programming interface access to network 401 resources. Server 404 could receive signal 302 measurement information from RF sensor 101.

With reference to FIG. 2, FIG. 2 depicts a side view of a preferred embodiment of a base station 201 comprising an RF sensor 101 located on an elevated platform. This embodiment could be referred to as a cell tower.

Parts identified in FIG. 2: 101—RF sensor; 201—Base station.

Base station 201 in this preferred embodiment comprises a cellular communications tower. In this configuration, base station 201 may comprise a 100 foot tall structure with antenna (s) mounted to it. Base station 201 in this embodiment could also comprise a network connection 113 to a network 401. Base station 201 in this embodiment may comprise communicating and/or sharing information with emergency vehicle 800, mobile station 801, and server 404. Base station 201 in this embodiment could also comprise MRBATS 1401.

Figure 3:
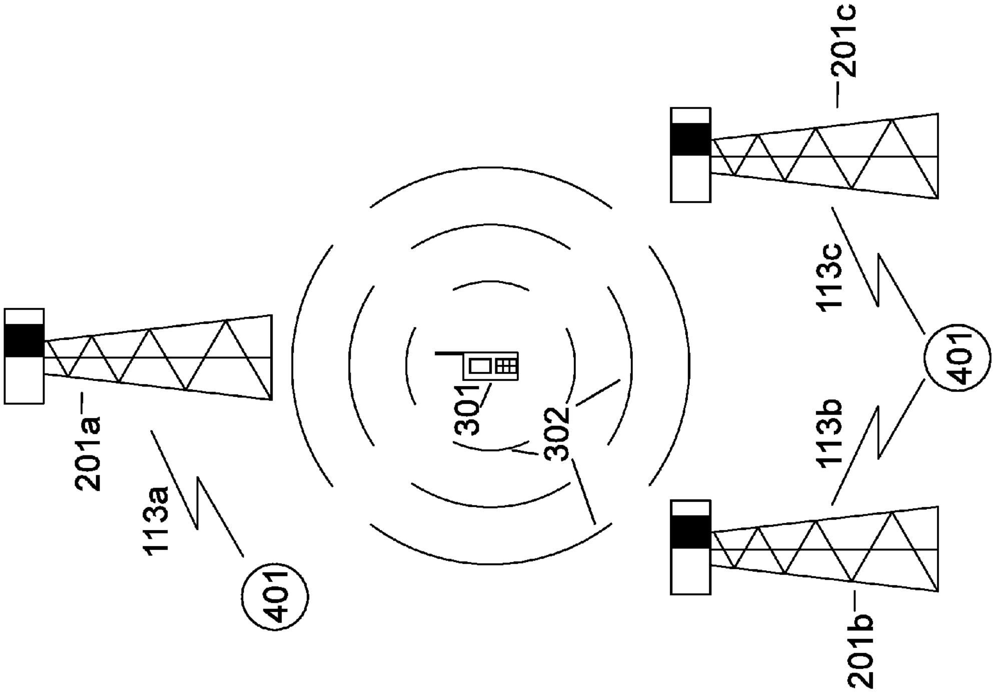
FIG. 3 depicts a preferred embodiment of the radio triangulation system of the present invention.

With reference to FIG. 3, FIG. 3 depicts a preferred embodiment of radio triangulation in the present invention. This embodiment comprises connections and components to calculate the radio transmitter location. Transmitter 301 in this embodiment comprises the emission of an omni-directional signal 302.

Parts identified in FIG. 3: 113*a*—Network connection “a;” 113*b*—Network connection “b;” 113*c*—Network connection “c;” 201(*a*)—Base Station “a;” 201(*b*)—Base Station “b;” 201(*c*)—Base Station “c;” 301—Radio transmitter; 302—Radio signal; 401—Network.

This preferred embodiment of the present invention could comprises transmitter 301. Signal 302 could propagate from radio transmitter 301 in an omni-directional format. Signal 302 propagating in a 360 degree format enables base stations 201*a*, 201*b*, and 201*c* to each measure it at the same time. Signal 302 measurement/detection information could be shared by base station (s) 201*a*, 201*b*, and 201*c* with network 401 by network connections 113*a*, 113*b*, and 113*c*.

With reference to FIG. 4, FIG. 4 illustrates an RF sensor network. Each of the network devices 119 are connected by network connections 113 to the network 401.

Parts identified in FIG. 4: 101 (*a*)—RF sensor “A;” 101 (*b*)—RF sensor “B;” 101 (*c*)—RF sensor “C”; 113—Network connection; 119—User interface; 401—Network; 404—Server.

RF sensor 101*a* could achieve network connection 113*b* to network 401. Server 404 could achieve network connection 113*c* to network 401. RF sensor 101*c* could achieve network connection 113*d* to network 401. RF sensor 101*b* could achieve network connection 113*e* to network 401. User interface 119 could achieve network connection 113*a* to network 401. Network 401 could achieve network connection to RF sensor 101*a*, RF sensor 101*b*, RF sensor 101*c*, server 404, and user interface 119.

Figure 5:
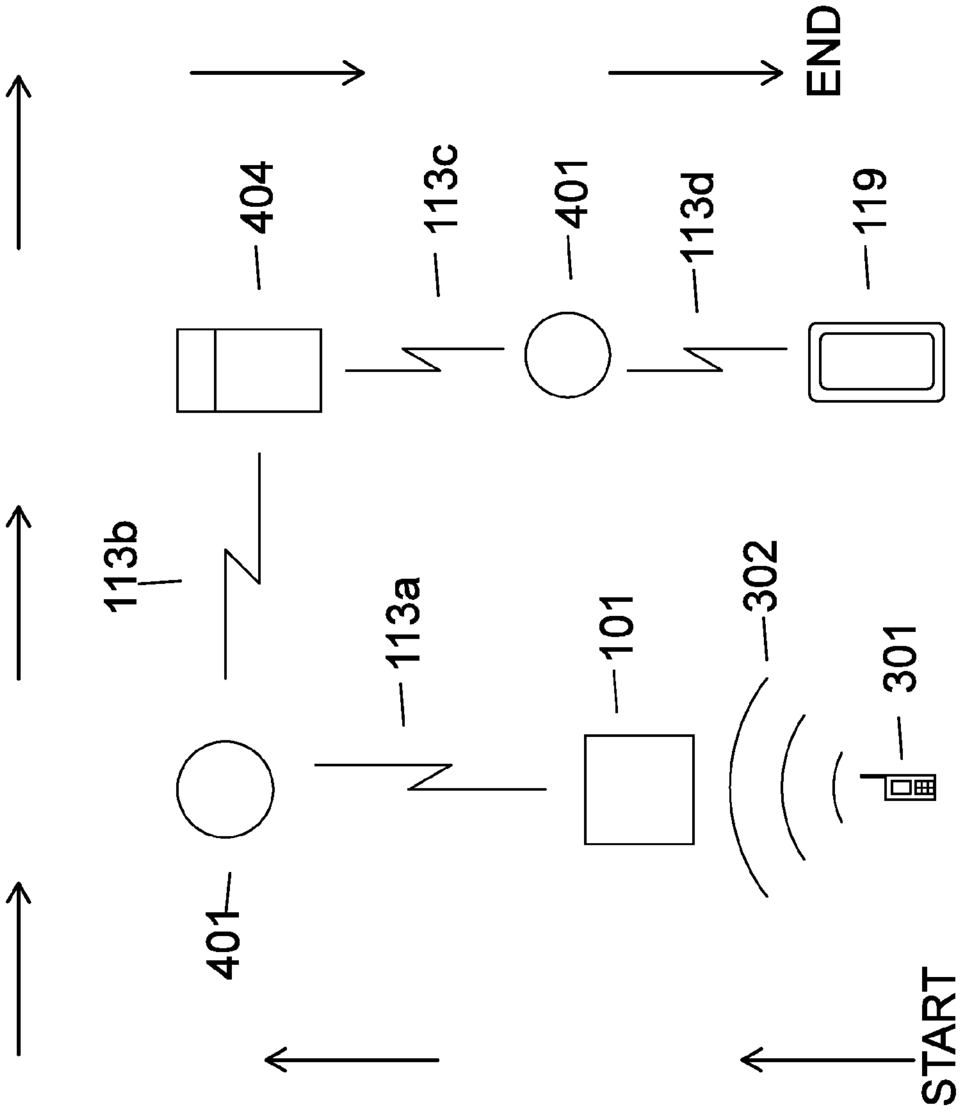
FIG. 5 illustrates a preferred embodiment of the radio signal data path from a vehicle equipped with a radio frequency transmitter to the radio frequency detector of the present invention.

With reference to FIG. 5, FIG. 5 illustrates a preferred embodiment radio signal data path from start to end-user. The signal path starts from the radio transmitter 301 and ends with user interface 119.

Parts identified in FIG. 5: 101—RF sensor; 113 (*a*)—Network connection “a;” 113 (*b*)—Network connection “b;” 113 (*c*)—Network connection “c;” 113 (*d*)—Network connection “d;” 119—User interface; 301—Radio transmitter; 302—Radio signal; 401—Network; 404—Server.

Radio transmitter 301 could transmit radio signal 302. RF sensor 101 could measure radio signal 302. Radio signal 302 measurements could be forwarded to network 401 by network connection 113*a*. Network 401 could achieve network connection 113*b* to server 404. Server 404 could achieve network connection 113*c* to network 401. Network 401 could achieve network connection 113*d* with user interface 119.

Figure 6:
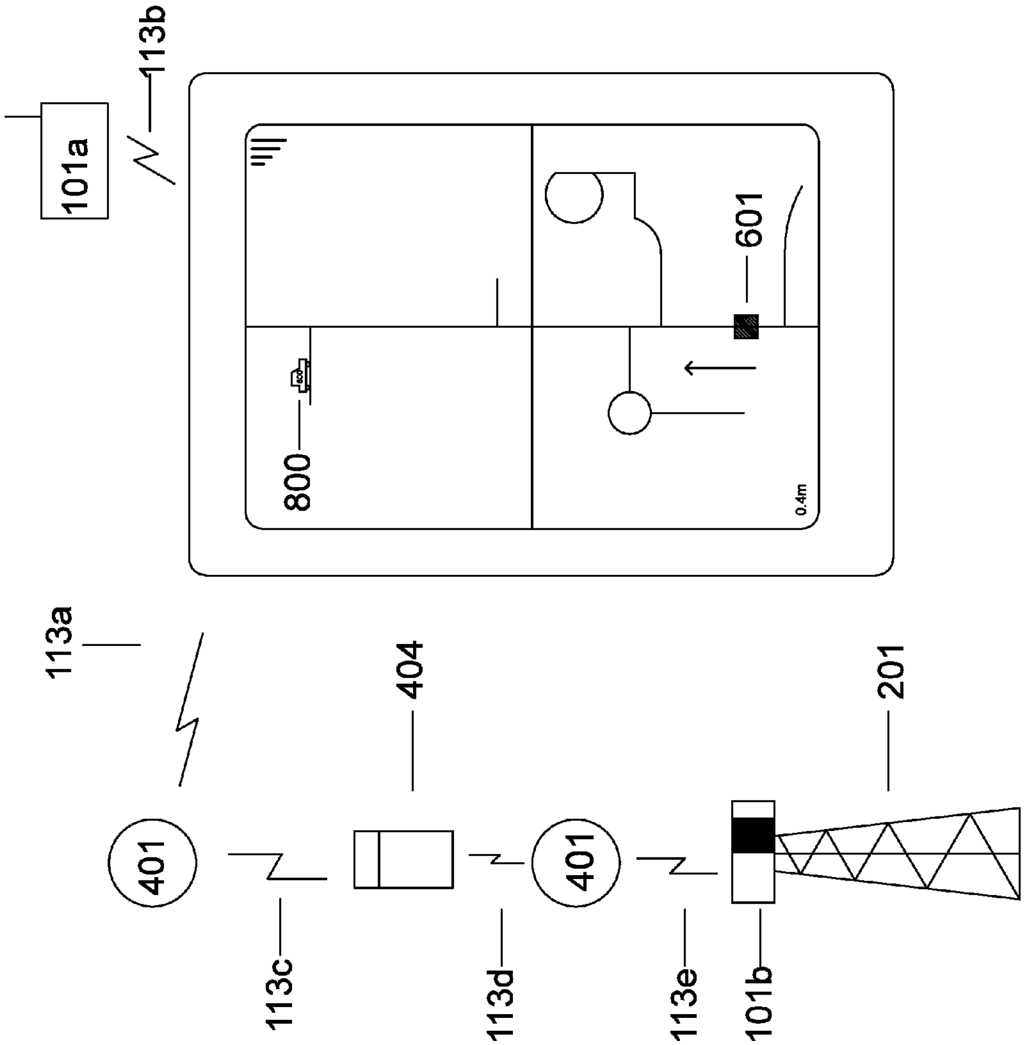
FIG. 6 illustrates a preferred embodiment of a user interface of the radio signal location detection device of the present invention.

With reference to FIG. 6, FIG. 6 illustrates a preferred embodiment of a user interface 119 with network connection 113*b* to sensor 101*a*. User interface displays emergency vehicle location, direction, and roads.

Parts identified in FIG. 6: 101 (*a*)—RF sensor 101 “A”; 101 (*b*)—RF sensor 101 “B”; 113 (*a*)—Network connection “a”; 113 (*b*)—Network connection “b”; 113 (*c*)—Network connection “c”; 113 (*d*)—Network connection “d”; 113 (*e*)—Network connection “e”; 119—User interface; 401—Network; 404—Server; 601—User interface 119 location; 800—Emergency vehicle depiction.

RF sensor 101*a* and/or RF sensor 101*b* could sense, detect, or measure a radio signal. User interface 119 could achieve network connection 113*a* with network 401. User interface 119 could also achieve network connection 113*b* to RF sensor 101*a*. User interface 119 could share RF sensor 101*a* signal measurement information with network 401 using network connection 113*a*. Base station 201, RF sensor 101*b*, could share information with network 401 by using network connection 113*e*, and/or network connection 113*c*. Network 401 could share information with server 404 using network connection 113*d*. User interface 119 in this embodiment presents roads, direction, emergency vehicle 800, and proximity information on a smartphone. User interface 119 in this embodiment could generate a felt, audible, or visual alert to warn motorists to the presence of a nearby emergency vehicle.

Figure 7:
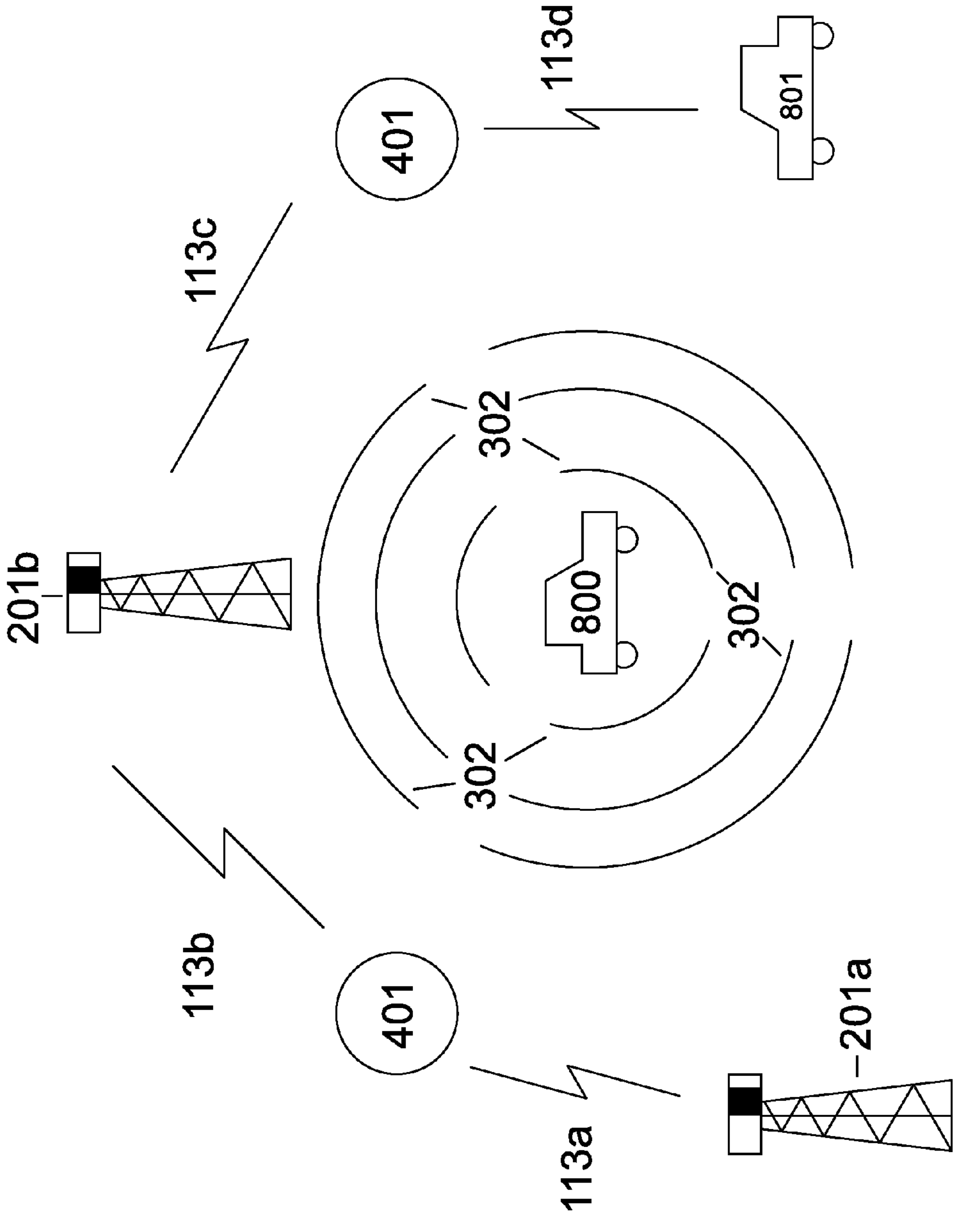
FIG. 7 illustrates another preferred embodiment of the present invention comprising base stations and a mobile station known as a hybrid radio frequency sensor network.

With reference to FIG. 7, FIG. 7 illustrates another preferred embodiment of the present invention comprising base stations and a mobile station. This form of network configuration could be known as a hybrid RF sensor network.

Parts shown in FIG. 7: 113*a*—Network connection “A”; 113*b*—Network connection “B”; 113*c*—Network connection “C”; 113*d*—Network connection “D”; 201*a*—Base station “A”; 201*b*—Base station “B”; 302—RF signal; 401—Network; 404—Server; 800—Emergency vehicle; 801—Mobile station.

Emergency vehicle 800 could emit RF signal 302 in an omni-directional format. Base stations 201(*a*) and/or base station 201*b* could measure RF signal 302. Base station 201*a* could achieve network connection 113*a* to network 401. Base station 201*b* could achieve network connection 113*b* and/or 113*c* to network 401. Mobile station 801 could also measure the same RF signal 302 as base station (s) 201*a* & 201*b*. Mobile station 801 in this preferred embodiment could share signal 302 measurement/detection information with network 401. Mobile station 801 in another preferred embodiment may not share signal 302 detection/measurement information with network 401 and configured to standalone as a radar detector apparatus. Base stations 201*a*, 201*b*, and mobile station 801*a* could share signal 302 information with network 401. Network 401 could provide mobile station 801 with emergency vehicle 800 location information.

With reference to FIG. 8, FIG. 8 depicts an embodiment of a network of mobile stations measuring a radio signal emitted from an emergency vehicle. In this embodiment each of the mobile stations are connected to a network.

Parts identified in FIG. 8: 101 (*a*)—RF sensor “A”; 101 (*b*)—RF sensor “B”; 101 (*c*)—RF sensor “C”; 113 (*a*)—Network connection “A”; 113 (*b*)—Network connection “B”; 113 (*c*)—Network connection “C”; 113 (*d*)—Network connection “D”; 113 (*e*)-Network connection “E”; 119—User interface; 301—Radio transmitter; 302—Radio signal;

401—Network; 404—Server; 800—Emergency vehicle; 801 (*a*)—Mobile Station “A”; 801 (*b*)—Mobile Station “B”; 801 (*c*)—Mobile Station “C”.

Emergency vehicle 800 could emit radio signal 302 in an omni-directional format. Mobile stations 801*a*, 801*b*, and 801*c* could detect and/or measure radio signal 302. Mobile stations 801*a*, 801*b*, and 801*c* may or may not share information with network 401 in one configuration. Mobile stations 801*a*, 801*b*, and 801*c* could each achieve network connection to network 401, server 404 and ultimately user interface 119. Server 404 could execute radio signal location algorithms FIG. 9 and/or FIG. 10. to determine location of emergency vehicle 800. Server 404 could share emergency vehicle 800 with mobile station (s) 801*a*, 801*b*, 801*c*, and/or user interface 119. User interface 119 could send/receive and display emergency vehicle location information for user to interpret. User interface 119 in this configuration could generate a touch, audible, or visual alert based upon signal 302 measurement information indicating emergency vehicle 800 proximity.

With reference to FIG. 9, FIG. 9 illustrates an example of a received signal strength indication (RSSI) radio transmitter location method. RSSI method uses the signal strength measurements from each base station to locate the radio transmitter. (Parts identified in FIG. 9: 201 (*a*)—Base Station “a”; 201 (*b*)—Base Station “b”; 201 (*c*)—Base Station “c”; 301—Radio transmitter; 302—Radio signal; 401—Network; 901 (*a*)—Signal 302 RSSI measurement @ Base station 201*a*; 901 (*b*)—Signal 302 RSSI measurement @ Base station 201*b*; 901 (*c*)—Signal 302 RSSI measurement @ Base station 201*c*.)

Radio transmitter 301 could emit radio signal 302. Base stations 201*a*, 201*b*, and 201*c* could measure radio signal 302 RSSI emitted by radio transmitter 301. Base station 201*a* RSSI measurement of signal 302 could be represented as 901*a*. Base station 201*b* RSSI measurement of signal 302 could be represented as 901*b*. Base station 201*c* RSSI measurement of signal 302 could be represented as 901*c*. Base stations 201*a*, 201*b*, and 201*c* could share radio transmitter 301 and radio signal 302 RSSI information with network 401, server 404, and user interface 119.

With reference to FIG. 10, FIG. 10 illustrates an example of a time difference of arrival (TDOA) radio transmitter location technique. TDOA method uses signal 302 time of arrival to determine the approximate location of transmitter 301.

Parts identified in FIG. 10: 113 (*a*)—Network Connection “a”; 113 (*b*)—Network Connection “b”; 113 (*c*)—Network Connection “c”; 119—User interface; 201 (*a*)—Base Station “A”; 201 (*b*)—Base Station “B”; 201 (*c*)—Base Station “C”; 301—Radio transmitter; 302—Radio signal; 401—Network; 404—Server; 1001 (*a*)—TDOA signal measurement “A”; 1001 (*b*)—TDOA signal measurement “B”; 1001 (*c*)—TDOA signal measurement “C”.

Radio transmitter 301 could emit radio signal 302. Base stations 201*a*, 201*b*, and 201*c*B could measure radio signal 302 emitted by radio transmitter 301. Base station 201*a* TDOA measurement of signal 302 could be represented as 1001*a*. Base station 201*b* TDOA measurement of signal 302 could be represented as 1001*b*. Base station 201*c* TDOA measurement of signal 302 could be represented as 1001*c*. Base stations 201*a*, 201*b*, and 201*c* could share radio signal 302 TDOA information with network 401, server 404, and user interface 119. Server 404 could receive signal 302 measurement information from RF sensor 101*a*. Server 404 could execute radio signal location method FIG. 10. to determine location of emergency vehicle 800 and/or radio transmitter 301. Server 404 could share method FIG. 10 radio signal location information by network connection (s) 113*a*, 113*b*, and/or 113*c* to network 401 and/or to a user interface 119. A user interface 119 could receive and display signal 302 location information derived from signal 302 measurements collected from base stations 201*a*, 201*b*, and/or 201*c* by accessing server 404 resources.

Figure 11:
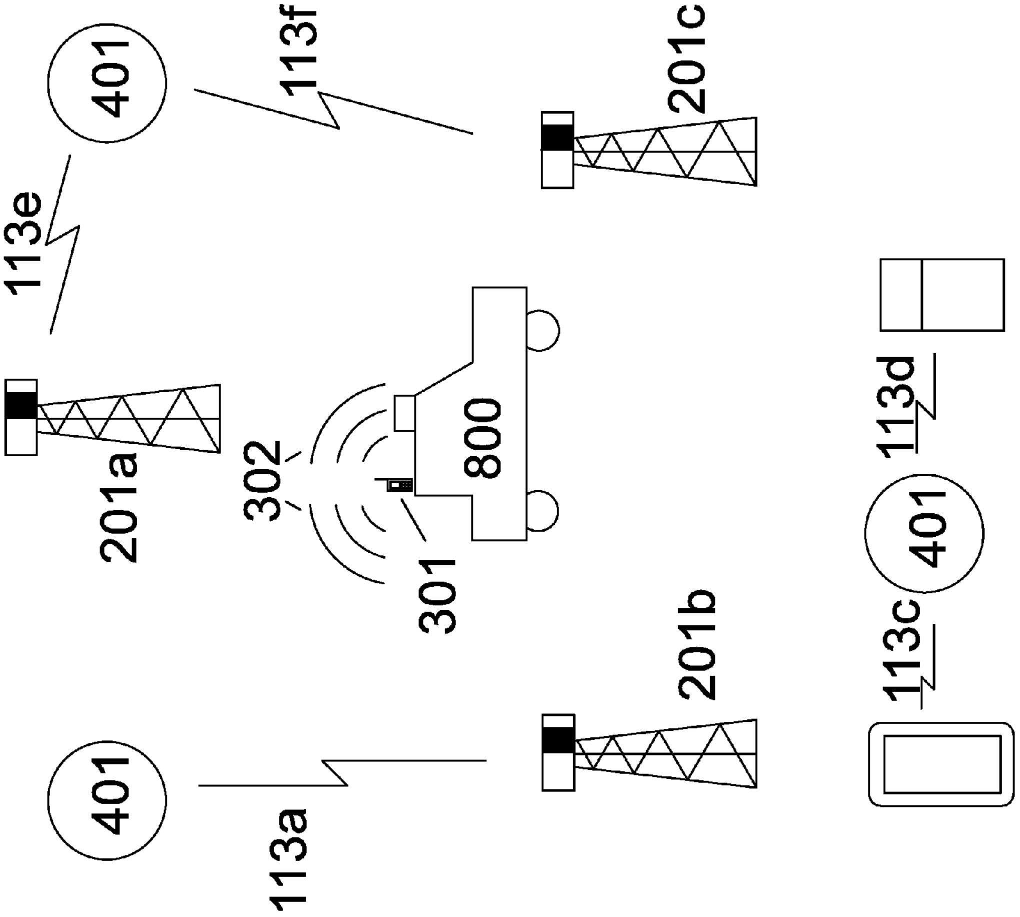
FIG. 11 is a schematic view depicting a system, and apparatus for emergency vehicle locating.

With reference to FIG. 11, FIG. 11 is a general view depicting a system, and apparatus for emergency vehicle locating. This embodiment demonstrates an RF sensor network collecting signal measurement for presentation on user interface 119 by network 401.

Parts identified in FIG. 11: 113 (*a*)—Network connection “a”; 113 (*b*)—Network connection “b”; 113 (*c*)—Network connection “c”; 113 (*d*)—Network connection “d”; 113 (*e*)—Network connection “e”; 113 (*f*)—Network connection “f”; 119—User interface; 201 (*a*) Base station “a”; 201 (*b*) Base station “b”; 201 (*c*) Base station “c”; 301—Radio transmitter; 302—Radio signal; 401—Network.

Emergency vehicle 800 could emit radio signal 302. Base station 201*a*, 201*b*, and 201*c* could measure radio signal 302. Base station 201*a* could achieve network connection 113*e* to network 401. Base station 201*b* could achieve network connection 113*a* to network 401. Base station 201*c* could achieve network connection 113*f* to network 401. Server 404 could receive signal 302 measurement information from RF sensor 101*a*. Server 404 could execute radio signal location method(s) FIG. 9 and or FIG. 10 to determine location of emergency vehicle 800. Server 404 could share radio signal 302 location information collected from base stations 201*a*, 201*b*, and/or 201*c* by network connection 113 to network 401 and user interface 119. User interface 119 could receive and display signal 302 location information. User interface 119 could generate a touch, audible, or visual alert based upon signal 302 measurement information indicating emergency vehicle 800 proximity to user interface 119.

Figure 12:
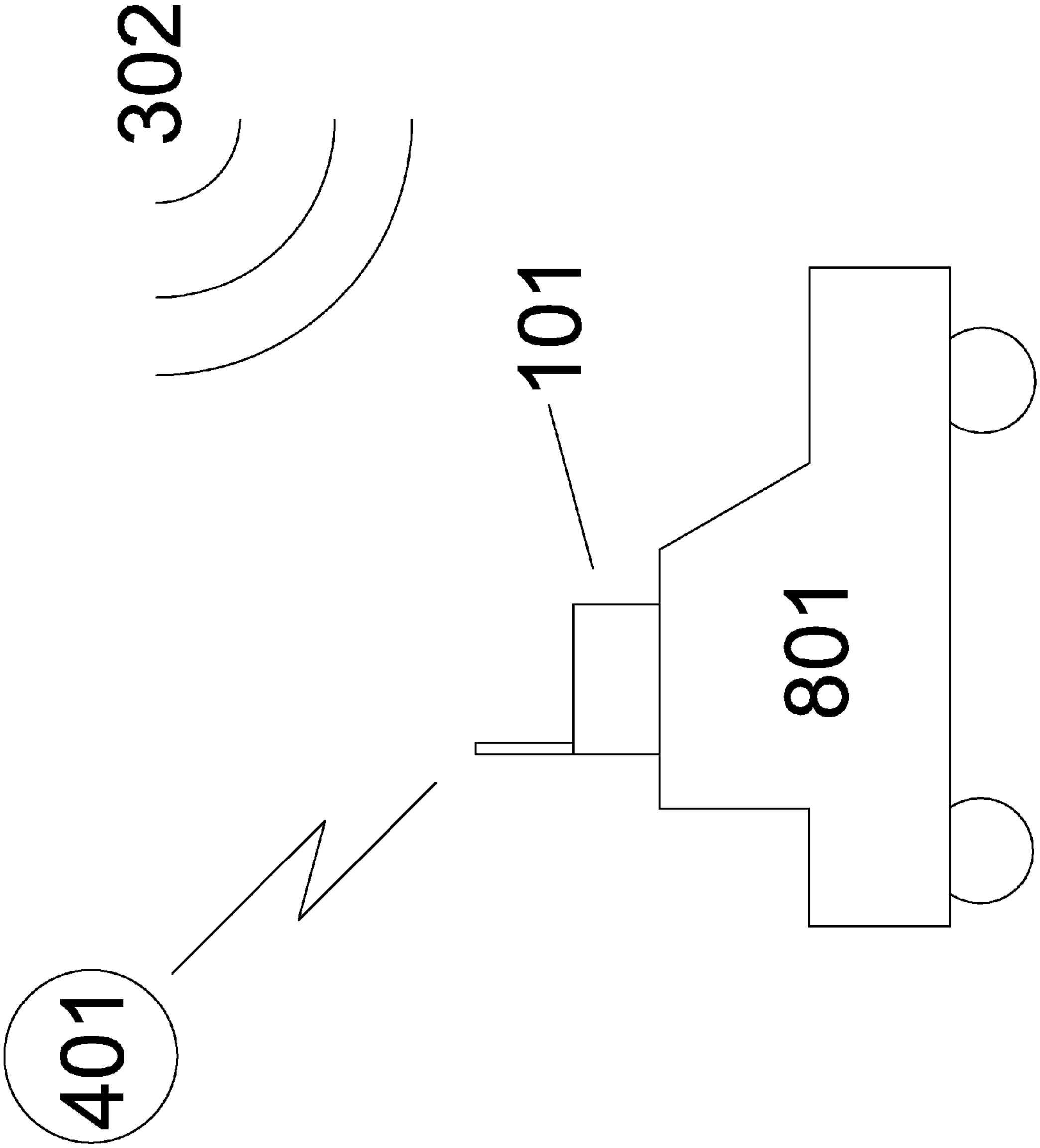
FIG. 12 depicts a preferred embodiment of a networked mobile station.

With reference to FIG. 12, FIG. 12 depicts a preferred embodiment of a networked mobile station. The mobile station is detecting/measuring a signal. (Parts identified in FIG. 12: 101—RF sensor; 302—Radio signal; 801—Mobile station.)

Mobile station 801 could detect/measure radio signal 302 with RF sensor 101. Mobile station 801 and/or RF sensor 101 could generate a touch, audible, and/or visual alert upon detecting signal 302. Mobile station 801 may or may not share radio signal 302 information with network 401 by network connection 113.

With reference to FIG. 13, FIG. 13 depicts a preferred embodiment of an emergency vehicle sending and receiving information from/to a base station 201 and/or mobile station 801. The emergency vehicle 800 could be transmitting 302 in a directional format and receiving from another base/mobile station. Parts identified in FIG. 13: 301—Radio transmitter; 302 *a*—Radio signal “A”; 302*b*—Radio signal “B”; 800—Emergency vehicle; 1301—Conduit connecting transmitter 301 to antenna 303.

Emergency vehicle 800 could connect to radio transmitter 301. Transmitter 301 in this embodiment is emitting a omni-directional signal. Transmitter 301 could share information with antenna 303. Antenna 303 in this embodiment is transmitting a directional signal. Emergency vehicle 800 could emit signal 302*a* in an omni-directional format. Emergency vehicle 800 could emit signal 302*b* in directional format.

Figure 14:
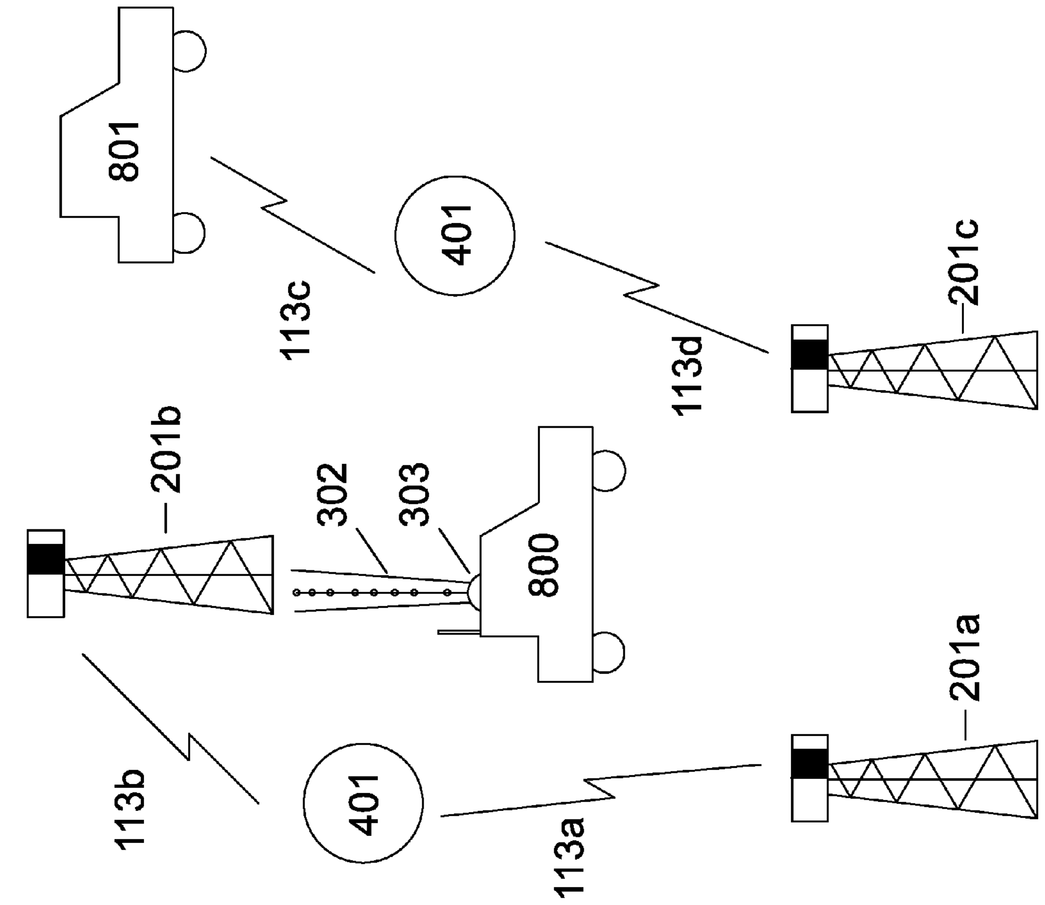
FIG. 14 depicts a preferred embodiment of an MRBATS system and antenna for the disruption of the present invention.

With reference to FIG. 14, FIG. 14 depicts a preferred embodiment MRBATS 1401 for the disruption of the present invention.

Parts identified in FIG. 14: 113*a*—Network connection 113 “A”; 113*b*’Network connection 113 “B”; 113*c*—Network connection 113 "C"; 113*d*—Network connection 113 "D"; 201*a*—Base station "A"; 201*b*—Base station "B"; 201*c*—base station "C"; 302—Radio signal; 303—Directional radio antenna; 401—Network; 800—Emergency vehicle; 801—Mobile station.

Emergency vehicle 800 could emit directional signal 302 by antenna 303. Antenna 303 could aim directional signal 302 toward base station 201*b*. Base station 201*b* could receive signal 302 from emergency vehicle 800. Base station 201*b* could comprise a different logical network. Base station 201*b* could use network connection 113*b* to connect to network 401. Base station 201*a* could use network connection 113*a* to connection to network 401. MRBATS 1401, antenna 303 could disrupt, "A method, system, and apparatus for emergency vehicle locating" by limiting the propagation path of signal 302 to a directional form. Base station 201*a*, 201*c*, & mobile station 801 may not sense, detect, or measure signal 302 in this embodiment.

Figure 15:
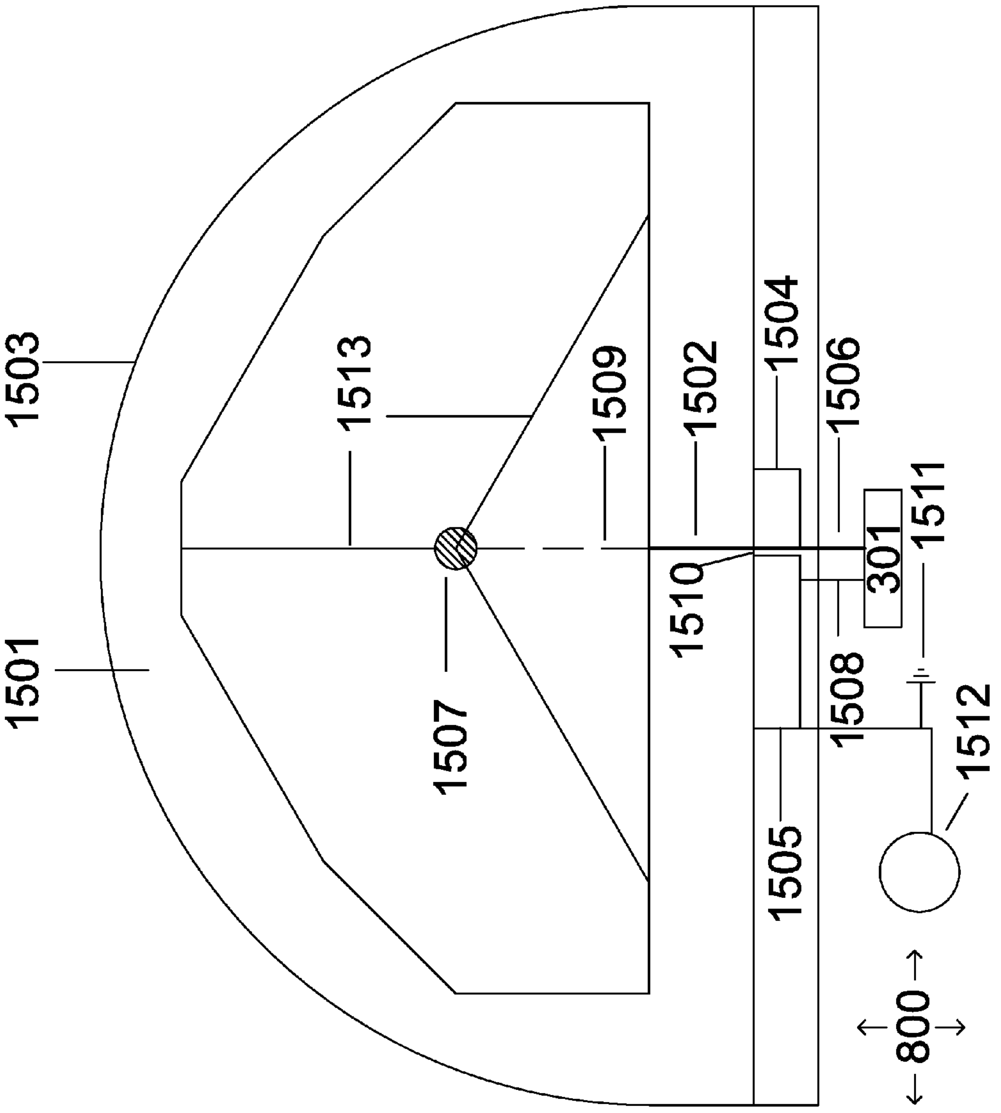
FIG. 15 depicts a side view of an exemplary embodiment of the MRBATS antenna of the system of FIG. 14.

With reference to FIG. 15, FIG. 15 depicts a side view of an embodiment of MRBATS 1401/antenna 303 mounted on a emergency vehicle. This embodiment of antenna 303 could be housed inside a non-reflective dome shell. Dish 1501 is pointing directly at the reader.

Parts identified in FIG. 15: 301 Radio transmitter; 303—Directional antenna; 800—Emergency vehicle; 1501—Reflective dish; 1502—Rotating drive axle conduit; 1503—Non-Reflective dome shell; 1504—Electric motor; 1505—Computer module; 1506—Signal interface; 1507—Feed antenna; 1508—Conduit from transmitter to module; 1509—Conduit from rotating axle to feed antenna; 1510—Rotating drive shaft; 1511—Electrical ground; 1512—12 V power source; 1513—Feed antenna support arms.

Directional antenna 303 apparatus could be housed inside non-reflective dome shell 1503. Antenna 303 apparatus could be attached to the top of an emergency vehicle 800. Dish 1501 connects support arms 1513 to position feed antenna 1507. Feed antenna 1507 could emit a signal toward dish 1501. Dish 1501 could reflect a signal in a directional format. Dish 1501 in this embodiment could rotate 360 degrees. Motor 1504 could rotate drive shaft 1510, and/or conduit 1502, 360 degrees. Drive axle could rotate dish 1501 360 degrees. Axle 1510 could rotate dish 1501 for direction-finding and tracking. Motor 1504 could receive rotational information for dish 1501 from computer module 1505. Module 1505 could control direction of dish 1501 by controlling motor 1504. Module 1505 could connect and/or share information with transmitter 301 by signal interface 1504. Module 1505 could connect to radio transmitter 301 by conduit 1508. Module 1505 could connect to 12 V power source 1512. Module 1505 could connect to ground 1511. Transmitter 301 could share direction-finding information with module 1505 to aim dish 1501 toward a base station.

Figure 16:
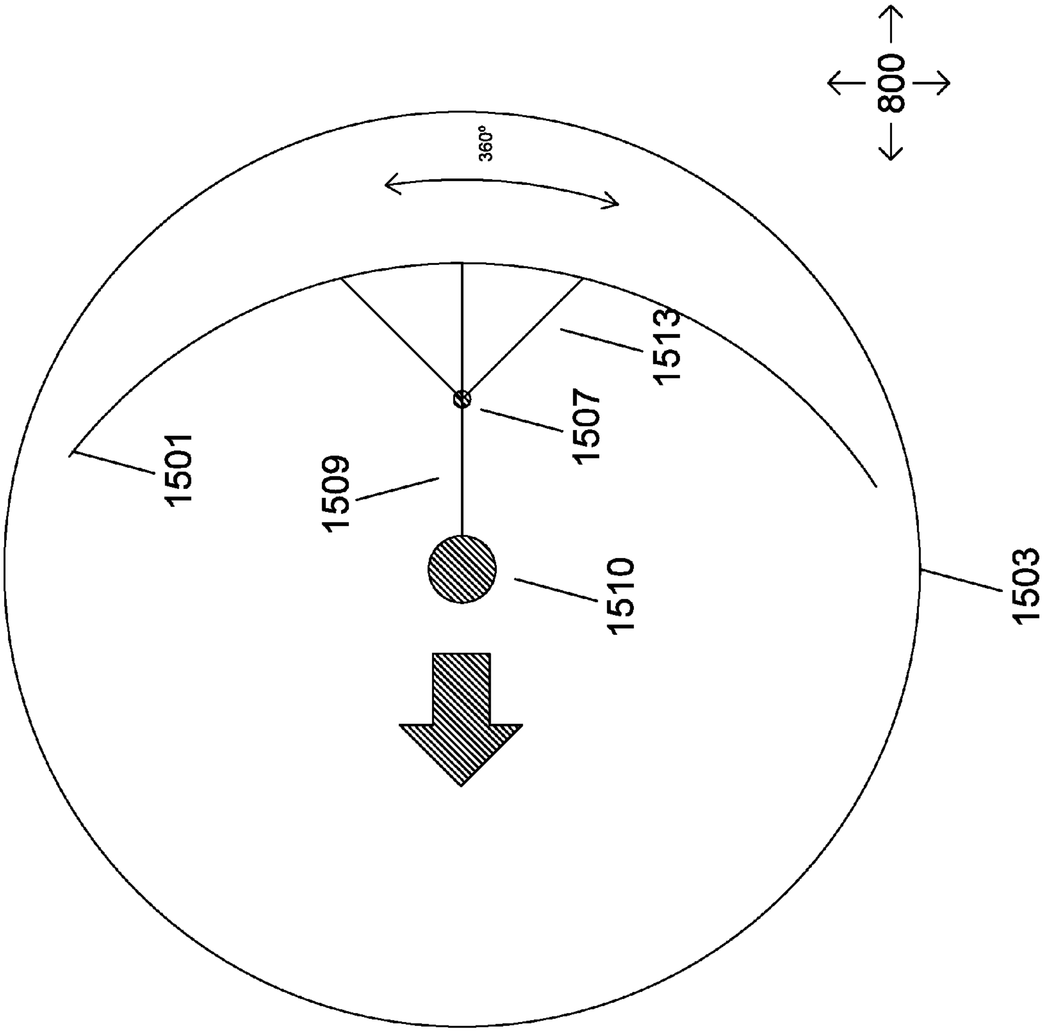
FIG. 16 depicts a top view of an exemplary embodiment of MRBATS antenna of the system of FIG. 14.

With reference to FIG. 16, FIG. 16 depicts a top view of an embodiment of MRBATS 1401/antenna 303 mounted on an emergency vehicle. This embodiment of antenna 303 could be housed inside a non-reflective dome shell. Parabolic dish 1501 is aimed to the left.

Parts identified in FIG. 16: 1501—Parabolic antenna; 1502—Rotating axle & Conduit; 1503—Dome shell; 1507—Feed antenna.

Parabolic dish 1501 in this embodiment is aimed to the left. Dish 1501 could rotate 360 degrees by rotating drive shaft 1510. A signal from a radio transmitter could use conduit 1509, 1502 to feed antenna 1507. Feed antenna 1507 could emit a signal toward dish 1501. Dish 1501 could reflect the signal from feed antenna 1507 in a directional form. Feed antenna support arms 1513 could position feed antenna 1507.

Figure 17:
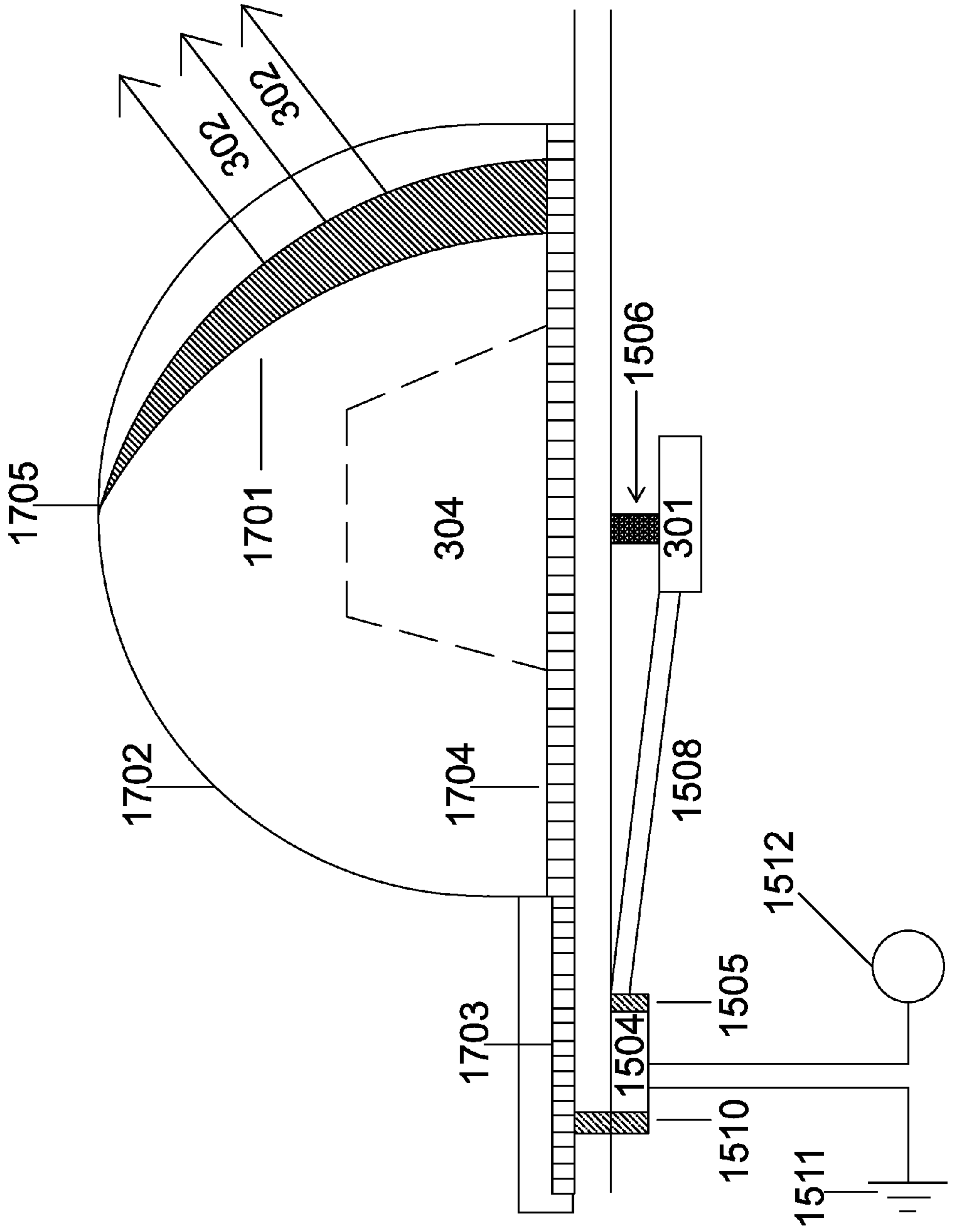
FIG. 17 depicts a side view of a gear driven, reflective rotatable dome, embodiment of an MRBATS antenna.

With reference to FIG. 17, FIG. 17 depicts a side view of another embodiment of antenna 303. This embodiment uses a gear-driven, in-ward reflective rotatable dome with a vertical aperture to change the signal propagation characteristics from omni-directional to directional. As the antenna 304 emits signal 302 in-ward reflective dome shell vertical aperture aims the radio signal from the antenna emits an inward reflective from the in a directional form.

Parts identified in FIG. 17: 301—Radio transmitter; 302—Radio signal; 304—Omni-directional antenna; 1505—Computer module; 1506—Conduit from transmitter 301 to antenna 304; 1508—Conduit connecting transmitter 301 to module 1505; 1510—Drive shaft; 1511—Ground; 1512—12 volt electrical connection; 1701—Vertical aperture; 1702—Inward reflective rotating dome w/vertical aperture; 1703—Drive gear sprocket; 1704—Dome 1702 outer sprocket gear; 1705—Top of aperture.

Antenna 304 could emit signal 302. Dome shell 1702 vertical aperture 170 could begin in the middle of the top of dome 1705 and widen as the aperture gets lower to its outer gear sprocket 1704. Antenna 303, dome shell 1702, vertical aperture 1702 could aim signal 302 in a directional format. Antenna 303 could emit signal 302 in a 30 degree wide directional path from left to right. Antenna 303 could emit signal 302 in a 90 degree propagation path from straight up and to the right. Dome shell 1702 could rotate 360 degrees. Transmitter 301 could connect to antenna 304 using conduit 1506. Transmitter 301 could connect and communicate with computer module 1505. Signal 302 could bounce off inward reflective rotating dome shell 1702. Signal 302 could pass through vertical aperture 1701. Module 1505 could connect and control electric motor 1504. Electric motor 1504 could rotate drive shaft 1510. Drive shaft 1510 could rotate drive sprocket 1703. Drive sprocket 1703 could rotate per module 1505 instruction. Drive sprocket 1703 could interact with dome sprocket gear 1704. Drive sprocket 1703 could turn dome sprocket gear 1704 to rotate dome 1702 to direct signal 302 at base station (s) 201.

Figure 18:
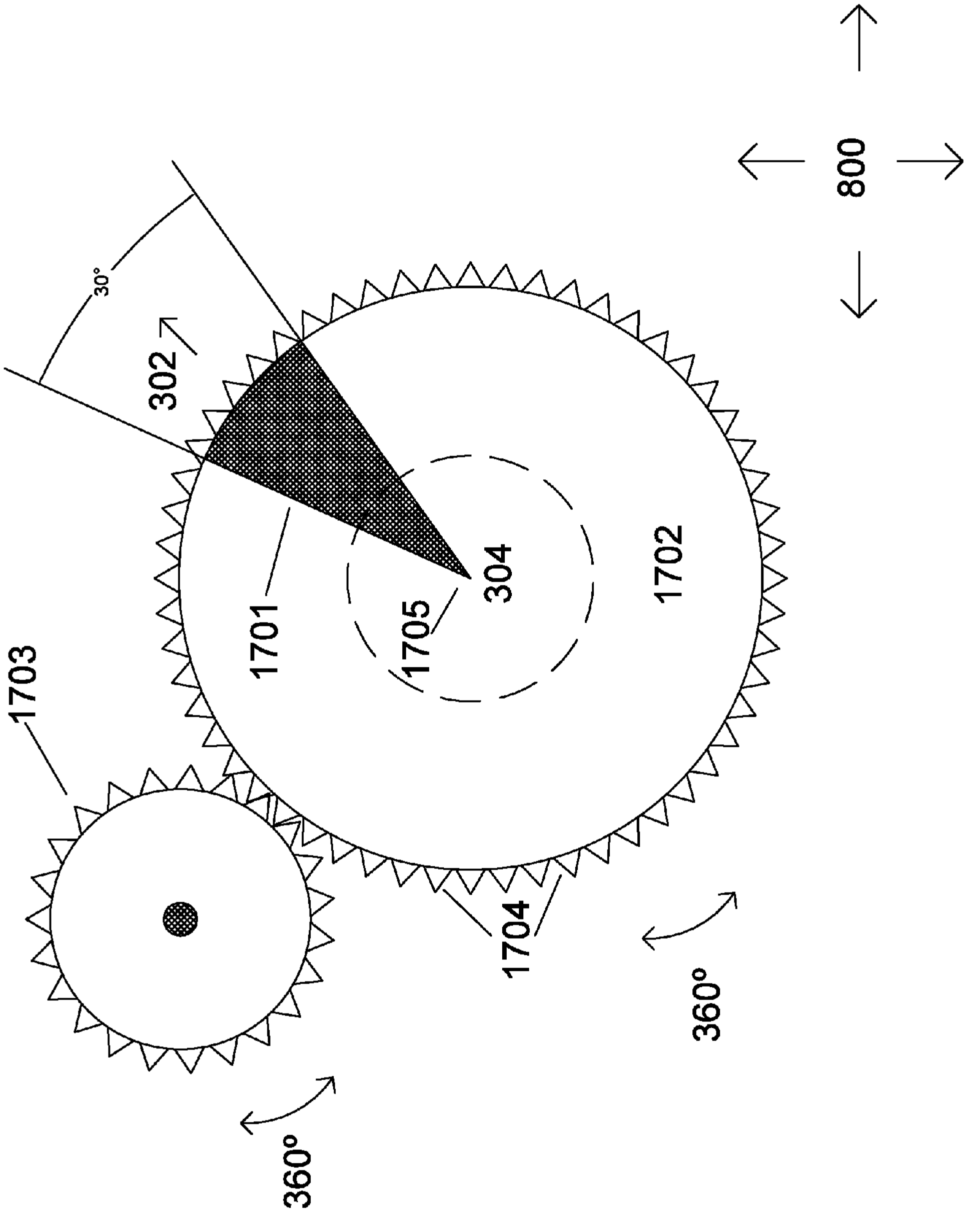
FIG. 18 depicts to view of the MRBATS antenna of FIG. 17.

With reference to FIG. 18, FIG. 18 depicts a view from the top looking down at an embodiment of antenna 303 that may be attached to an emergency vehicle 300. Aperture 1701 could project signal 302 away from antenna 304 in a directional format.

Parts identified in FIG. 18: 302—Radio signal; 304—Omni-directional antenna; 800—Emergency vehicle; 1701—Vertical aperture; 1702—In-ward reflective dome shell; 1703—Drive sprocket gear; 1704—Dome sprocket gear; 1705—Top of vertical aperture.)

Antenna 304 could comprise emergency vehicle 800. Antenna 304 could emit signal 302. Antenna 304 could emit signal 302 in an omni-directional format and could reflect inside dome 1702. Dome 1702 could emit signal 302 from aperture 1701 in a directional format. Signal 302 could emit from aperture 1701 in a horizontal 30 degree wide directional format from left to right. Signal 302 could emit from vertical aperture 1701 in a vertical 90 degree directional format from top center of dome 1702 known as top of vertical aperture 1705. Drive sprocket 1703 could rotate 360 degrees. Drive sprocket 1703 could rotate in a different direction than dome sprocket gear 1704. Drive sprocket 1703 could rotate dome 1702 and aperture 360 degrees.

With reference to FIG. 19, FIG. 19 depicts a top view of another preferred embodiment of antenna 303. In this configuration antenna 303 may emit signal 302 from one directional antenna 2301 at a time.

Parts identified in FIG. 19: 1505—Computer module; 2301 (*a*)—Directional panel antenna 2301 "A"; 2301 (*b*)—

Directional panel antenna 2301 "B"; 2301 (*c*)—Directional panel antenna 2301 "C"; 2301 (*d*)—Directional panel antenna 2301 "D"; 2302 (*a*)—Conduit from antenna 2301*a* to module 1505; 2302 (*b*)—Conduit from antenna 2301*b* to module 1505; 2302 (*c*)—Conduit from antenna 2301*c* to module 1505; 2302 (*d*)—Conduit from antenna 2301*d* to module 1505.)

In this preferred embodiment of antenna 303, module 1505 may share information with transmitter 301. Transmitter 301 could share information with module 1505 to instruct the appropriate antenna 2301 to actively emit signal 302. In this specific example of a preferred embodiment of antenna 303, directional antenna 2301*c* may actively emit signal 302 toward a base-station 201.

With reference to FIG. 20, FIG. 20 depicts a side view of the same embodiment of antenna 303 in FIG. 19. This embodiment of antenna 303 comprises a plurality of antenna 2301.

Parts identified in FIG. 20: 302—RF signal; 1505—Computer module; 2301 (*a*)—Directional panel antenna 2301 "A"; 2301 (*b*)—Directional panel antenna 2301 "B"; 2301 (*c*)—Directional panel antenna 2301 "C"; 2301 (*d*)—Directional panel antenna 2301 "D" 2302 (*a*)—Conduit from antenna 2301*a* to module 1505; 2302 (*b*)—Conduit from antenna 2301*b* to module 1505; 2302 (*c*)—Conduit from antenna 2301*c* to module 1505; 2302 (*d*)—Conduit from antenna 2301*d* to module 1505.

In a preferred embodiment of antenna 303 transmitter 301 could share information and communicate with base station 201/mobile station 801 using this preferred embodiment of antenna 303. Computer module 1505 could communicate and/or share information with antenna (s) 2301*a*, 2301*b*, 2301*c*, and 2301*d* using conduit (s) 2302*a*, 2302*b*, 2302*c*, and 2302*d*, respectively. In this embodiment of antenna 303 only one antenna 2301 may emit signal 302 at a time. In this example antenna 2301*c* is emitting signal 302 toward base-station 201/mobile-station 801. RF signal 302 in this embodiment comprises a directed signal spread of 100 degrees emanating away from antenna 2301*c*.

Figure 21:
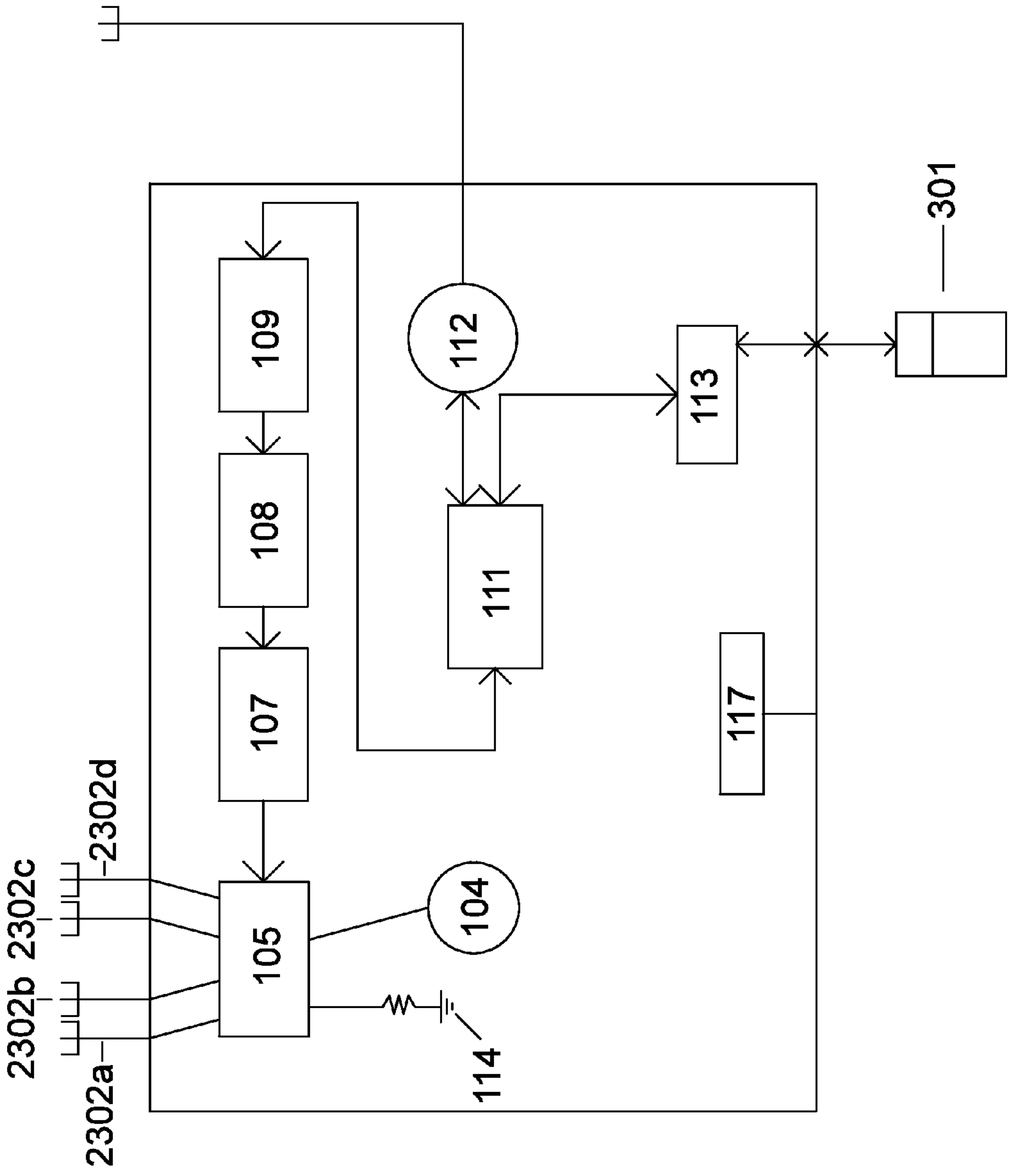
FIG. 21 depicts a perspective view of a box diagram for computer module for in with the radio frequency detection system of the present invention.

With reference to FIG. 21, FIG. 21 depicts a perspective view of a box diagram for computer module 1505 components.

Parts identified in FIG. 21: 104—Test signal; 105—RF switch; 107—RF tuner; 108—Analog to digital converter; 109—Digital signal processor; 111—Central Processing Unit; 112 GPS block; 113—Network connection; 114—Electrical ground; 117—Electric power; 120—GPS antenna; 302—Radio signal; 2301 (*a*)—Directional antenna "A"; 2301 (*b*)—Directional antenna "B"; 2301 (*c*)—Directional antenna "C"; 2301 (*d*)—Directional antenna "D".)

The above components in operation could comprise, but is not limited to, transmitter 301 sharing information with module 1505. CPU 111 could process base-station 201 directional information from transmitter 301. CPU 111 could also process base-station 201 GPS direction-finding information from GPS block 112. CPU 111 could instruct antenna 303 to emit signal 302 from the appropriate directional antenna that may be directed at base-station 201. CPU 111 could connect to digital signal processor 109. GPS antenna 120 could receive GPS information from GPS satellites and share this information with CPU 111. For example, if antenna 2301*c* is in the best position to achieve a network connection from base station 201 and/or mobile-station 801, then antenna 2301*c* could emit signal 302. DSP 109 could build the IF format of signal 302 for wide RF signal spans. Power supply 117 could provide electric power to module 1505. Electrical ground 114 could provide an electrical ground for module 1505. Analog digital converter 108 could convert signal 302 to an analog format. RF tuner 107 could up-convert signal 302 from IF to an RF format. In RF format signal 302 may emit from the appropriate directional antenna 2301*a*, 2301*b*, 2301*c*, 2301*d*, antenna 303/304.

The foregoing descriptions of the preferred embodiments of the invention have been presented for the purposes of illustration and description only. They are not intended to be exhaustive or to limit the invention to the precise form(s) disclosed. Many modifications and variations are possible in light of the above teaching and in keeping with the spirit of the invention described herein. It is intended that the scope of the invention not be limited by this specification, but only by the claims and the equivalents to the claims appended hereto.

What is claimed is:

1. A server for determining a location information of a vehicle emitting a radio frequency ("RF") signal, the server comprising:

a. a network connection to receive a plurality of signal measurement information from a plurality of detection devices that detect a radio signal emitted by the vehicle;

b. a processor that determines the location information using a calculation methodology based on information selected from the group consisting of i. a received signal strength indicator of the plurality of signal measurement information at the server, ii. a time differences of arrival the plurality of signal measurement information at the server, iii. an angle of arrival of the plurality of signal measurement information at the server, and iv. times of arrival of the plurality of signal measurement information at the server, wherein the location information is transmitted to a user interface via the network connection; and c. an RF sensor, wherein the RF sensor further comprises:

i. a first RF antenna, ii. a second RF antenna, wherein the first RF antenna detects a different frequency than the second RF antenna, iii. an RF switch to switch between the first RF antenna and the second RF antenna, iv. a preselection filter to prevent overload by electromagnetic energy in an RF spectrum at the first and second RF antennas, v. an RF tuner to down-convert the radio signal from a radio frequency signal to an intermediate frequency ("IF") signal, vi. an analog digital converter to convert the IF signal to a digital format;

v. a digital signal processor to decimate the IF signal for wider RF signal spans and for identification and measurement of other signals of interest located in the RF spectrum;

viii. a global positioning system ("UPS") block to generate timing signals to synchronize measurement of additional signals from additional sensors at additional locations, and ix. a capture memory buffer to store a plurality of signal measurement information.

2. The station of claim 1, further comprising a radio peripheral, the radio peripheral comprising a radio transceiver configured to recognize, filter, and dissect a radio network traffic.

3. A user interface for alerting a user of a location of a vehicle, comprising:

a. a network connection to receive a location information from a server, wherein the location information is of a vehicle emitting a radio signal determined by processing a plurality of signal measurement information collected by a plurality of detection devices and sent to the server via the network connection;

b. a processor configured to execute a software application to generate an alert indicating the location of the vehicle, and c. an RF sensor, wherein the RF sensor further comprises:

i. a first RF antenna, ii. a second RF antenna, wherein the first RF antenna detects a different frequency than the second RF antenna, iii. an RF switch to switch between the first RF antenna and the second RF antenna, iv. a preselection filter to prevent overload by electromagnetic energy in an RF spectrum at the first and second RF antennas, v. an RF tuner to down-covert the radio signal from a radio frequency signal to an intermediate frequency ("IF") signal, vi. an analog digital converter to convert the IF signal to a digital format, vii. a digital signal processor to decimate the IF signal for wider RF signal spans and for identification and measurement of other signals of interest located in the RF spectrum, viii. a global positioning system ("GPS") block to generate timing signals to synchronize measurement of additional signals from additional sensors at additional locations, and ix. a capture memory buffer to store a plurality of signal measurement information.

4. The user interface of claim 3, further comprising a signal detection indicator to generate an alert when the vehicle is within a pre-determined radius of the user interface.

* * * * *

UNITED STATES PATENT AND TRADEMARK OFFICE

CERTIFICATE OF CORRECTION

PATENT NO. : 8,774,837 B2
APPLICATION NO. : 13/460760
DATED : July 8, 2014
INVENTOR(S) : Wright It is certified that error appears in the above-identified patent and that said Letters Patent is hereby corrected as shown below:

On the title page, item [57] on the Abstract Page, Delete:
"A system for determining the location of at least one vehicle, the at least on vehicle emitting a detectable signal. The system comprising at least one mobile or stationary detection device that detects the signal emitted by the at least one vehicle. A server with operational software for tracking and locating the at least one vehicle emitting a detectable signal, and a user interface device for interfacing with the network for providing location information on the at least one vehicle."

And insert:

--A system for determining the location of at least one vehicle, the at least one vehicle emitting a detectable signal. The system comprising at least one mobile or stationary detection device that detects the signal emitted by the at least one vehicle. A server with operational software for tracking and locating the at least one vehicle emitting a detectable signal, and a user interface device for interfacing with the network for providing location information on the at least one vehicle.--

Signed and Sealed this
Seventh Day of October, 2014

Michelle K. Lee

Michelle K. Lee
*Deputy Director of the United States Patent and Trademark Office*